United States Patent
Liu et al.

(10) Patent No.: US 11,509,241 B2
(45) Date of Patent: Nov. 22, 2022

(54) POWER CONVERSION SYSTEM WITH N POWER CONVERTERS, EACH HAVING 2 OUTPUTS

(71) Applicant: Delta Electronics (Shanghai) Co., Ltd., Shanghai (CN)

(72) Inventors: Hong Liu, Shanghai (CN); Cheng Lu, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 150 days.

(21) Appl. No.: 17/153,551

(22) Filed: Jan. 20, 2021

(65) Prior Publication Data

US 2022/0140746 A1    May 5, 2022

(30) Foreign Application Priority Data

Nov. 5, 2020 (CN) .................. 202011222500.1

(51) Int. Cl.
*H02M 3/28* (2006.01)
*H02M 7/49* (2007.01)
(Continued)

(52) U.S. Cl.
CPC .............. *H02M 7/49* (2013.01); *H02J 3/06* (2013.01); *H02M 1/008* (2021.05); *H02M 3/285* (2013.01);
(Continued)

(58) Field of Classification Search
CPC .... H02M 1/008; H02M 3/285; H02M 1/0074; H02M 1/4208; H02M 7/49; H02M 7/493; H02J 3/06
See application file for complete search history.

(56) References Cited

U.S. PATENT DOCUMENTS

2020/0350827 A1* 11/2020 Ahmed .................. H02M 3/01
2021/0044208 A1*  2/2021 Li ....................... H02M 3/155

FOREIGN PATENT DOCUMENTS

CN    109004866 A    12/2018

OTHER PUBLICATIONS

Ouyang, Shao-Di et al., Comparison of Several Modular Multi-output Power Electronic Transformer topologies on Unbalanced Load Compensation Capability, School of Electrical Engineering, Xi'an Jiaotong University, China, vol. 36, No. 5, May 2017.

* cited by examiner

*Primary Examiner* — Harry R Behm
(74) *Attorney, Agent, or Firm* — Kirton McConkie; Evan R. Witt

(57) ABSTRACT

A power conversion system includes N power converters. Each power converter includes an input terminal, a first output terminal and a second output terminal. Each of the N power converters receives a DC power through the corresponding input terminal. The first output terminal of a first power converter of the N power converters and the second output terminal of an N-th power converter of the N power converters are connected in parallel to form an N-th total output terminal to output an N-th total output power. The first output terminal of an i-th power converter of the N power converters and the second output terminal of an (i−1)-th power converter of the N power converters are connected in parallel to form an (i−1)-th total output terminal to output an (i−1)-th total output power.

17 Claims, 28 Drawing Sheets

(51) Int. Cl.
   *H02M 7/493*     (2007.01)
   *H02J 3/06*      (2006.01)
   *H02M 1/00*      (2006.01)
   *H02M 1/42*          (2007.01)
(52) U.S. Cl.
   CPC .......... *H02M 7/493* (2013.01); *H02M 1/0074* (2021.05); *H02M 1/4208* (2013.01)

POWER CONVERSION SYSTEM WITH N POWER CONVERTERS, EACH HAVING 2 OUTPUTS

CROSS-REFERENCE TO RELATED APPLICATION

This application claims priority to China Patent Application No. 202011222500.1, filed on Nov. 5, 2020, the entire contents of which are incorporated herein by reference for all purposes.

FIELD OF THE INVENTION

The present disclosure relates to a power conversion system, and more particularly to a power conversion system with low cost, high efficiency and low power loss.

BACKGROUND OF THE INVENTION

Generally, power conversion systems are used for power conversion. The conventional power conversion systems are usually classified into two types according to the circuit topologies.

The first type of power conversion system is a single-port power conversion system including a plurality of power converters. The output terminals of the plurality of power converters are connected with each other in parallel, and the single-port power conversion system outputs power through the same output port. However, the single-port power conversion system cannot meet the multi-port requirements. In addition, it is necessary to additionally install an isolated transformer to isolate the plurality of power converters. Consequently, the power conversion system is not cost-effective, and the charging efficiency is impaired.

The second type of power conversion system is a multi-port power conversion system including a plurality of power converters. The output port of each power converter is directly connected with the corresponding load. That is, the plurality of power converters output the powers independently. However, since the plurality of power converters output the powers independently, it is difficult to balance the powers from the plurality of power converters to achieve the voltage-sharing purpose. On the other hand, a large amount of reactive current needs to be injected into the power conversion system to balance the voltage. Therefore, the power conversion system is unable to meet the power factor requirements and the efficiency of the power conversion system is impaired.

Therefore, there is a need of providing an improved power conversion system in order to overcome the drawbacks of the conventional technologies.

SUMMARY OF THE INVENTION

The present disclosure provides a power conversion system with low cost, high efficiency and low power loss.

In accordance with an aspect of the present disclosure, a power conversion system is provided. The power conversion system includes N power converters. Each power converter includes an input terminal, a first output terminal and a second output terminal. Each of the N power converters receives a DC power through the corresponding input terminal. The first output terminal of a first power converter of the N power converters and the second output terminal of an N-th power converter of the N power converters are connected in parallel to form an N-th total output terminal to output an N-th total output power. The first output terminal of an i-th power converter of the N power converters and the second output terminal of an (i−1)-th power converter of the N power converters are connected in parallel to form an (i−1)-th total output terminal to output an (i−1)-th total output power. Moreover, i is an integer greater than or equal to 2 and less than N, and N is an integer.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
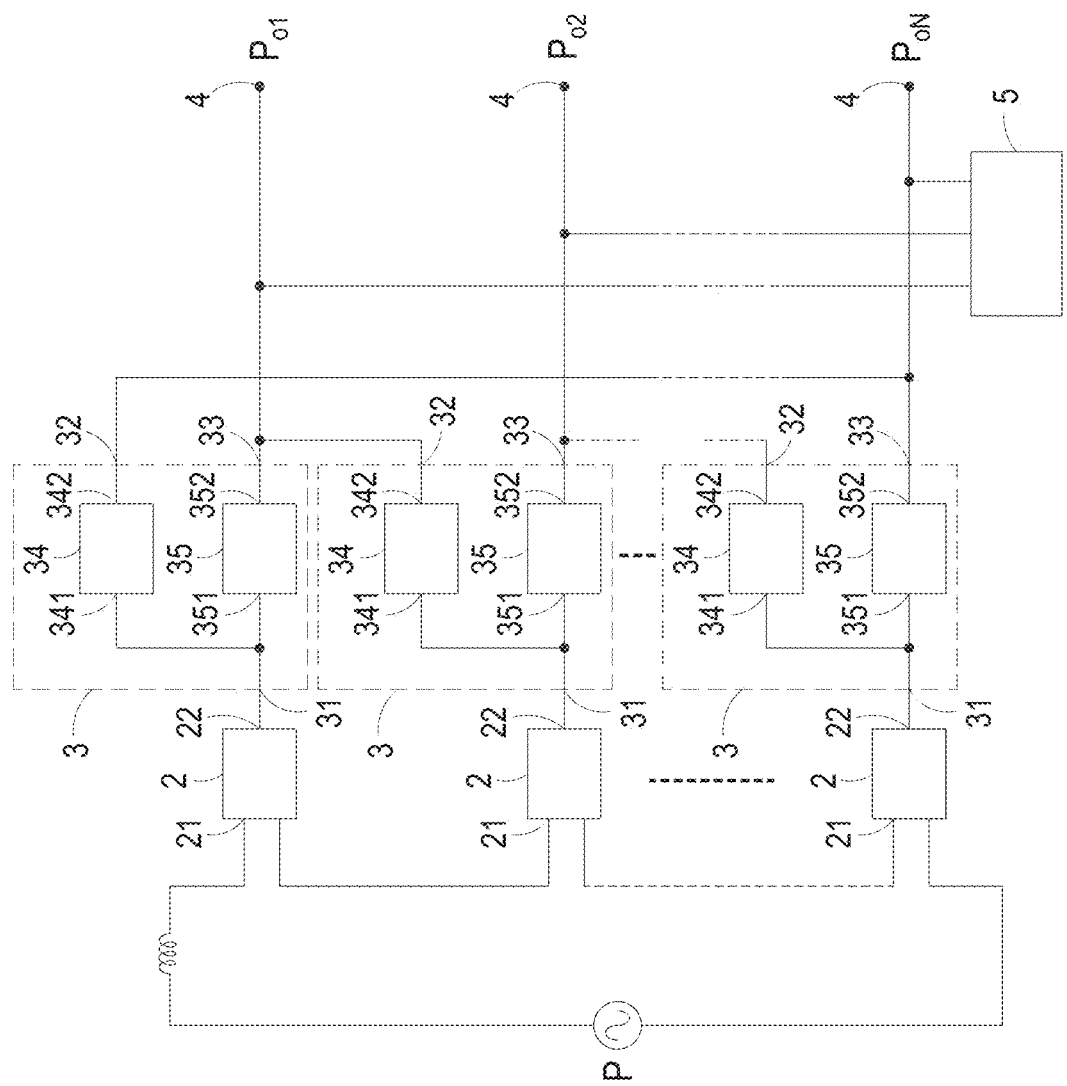
FIG. 1 is a schematic circuit block diagram illustrating a power conversion system according to a first embodiment of the present disclosure.
Figure 2:
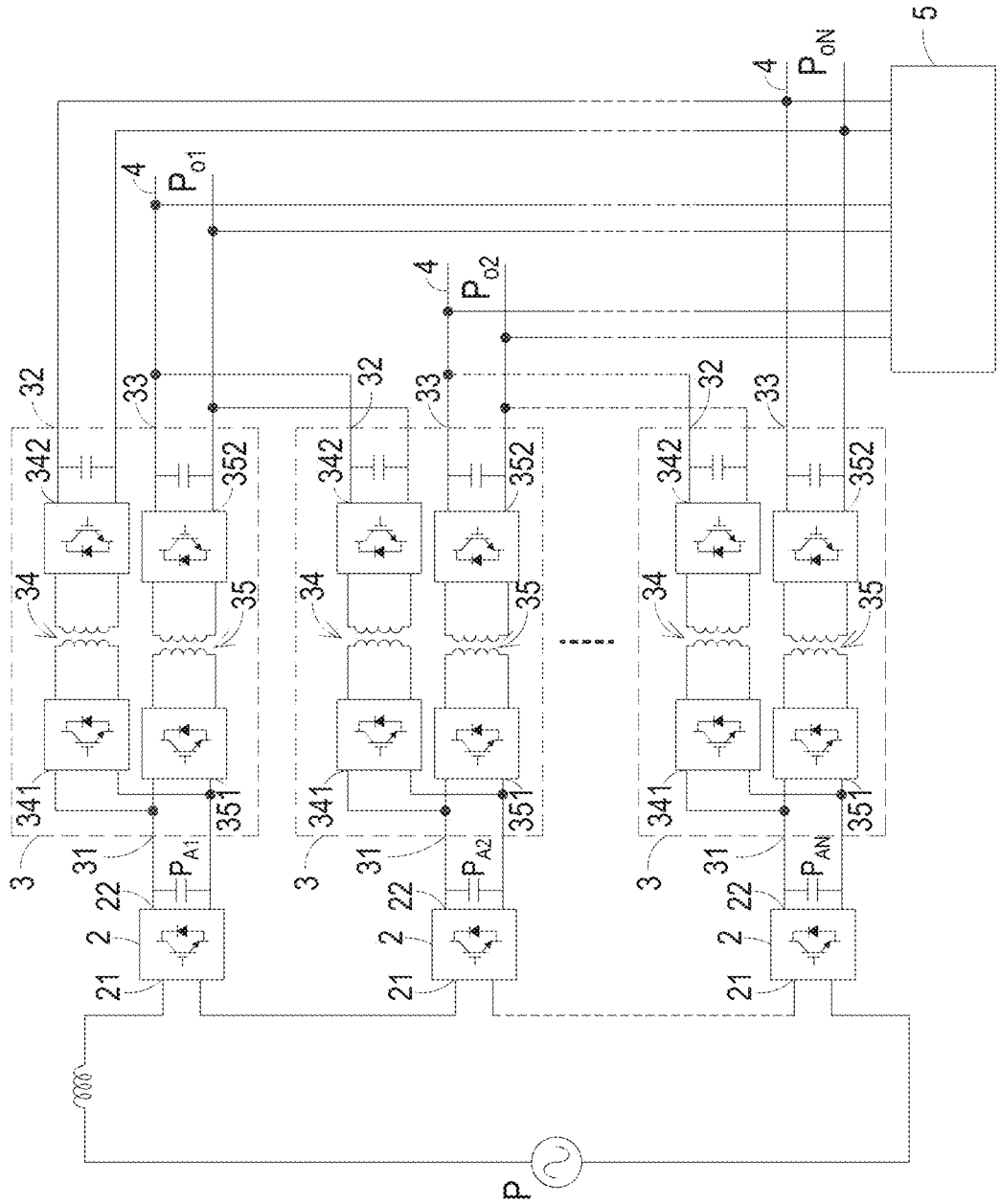
FIG. 2 is a schematic circuit diagram illustrating the detailed circuitry structure of the power conversion system as shown in FIG. 1.

Please refer to FIGS. 1 and 2. FIG. 1 is a schematic circuit block diagram illustrating a power conversion system according to a first embodiment of the present disclosure. FIG. 2 is a schematic circuit diagram illustrating the detailed circuitry structure of the power conversion system as shown in FIG. 1. The power conversion system 1 includes N rectifier units 2, N power converters 3 and N total output terminals 4. The power conversion system 1 outputs N total output powers to N loads (not shown) through the N total output terminals 4, wherein each output power is provided to the corresponding one of the N loads. The i-th total output terminal 4 of the N total output terminals 4 outputs the i-th total output power $P_{oi}$ to the i-th load. For example, the first total output terminal 4 outputs the first total output power $P_{o1}$ to the first load. The second total output terminal 4 outputs the second total output power $P_{o2}$ to the second load. The N-th total output terminal 4 outputs the N-th total output power $P_{oN}$ to the N-th load. Each of the N rectifier units 2 includes an input terminal 21 and an output terminal 22. The input terminals 21 of the N rectifier units 2 are connected with each other in series and connected to an AC power source P. Each rectifier unit 2 converts the AC power from the AC power source P into a DC Power. The i-th rectifier unit 2 of the N rectifier units 2 outputs the i-th DC power $P_{Ai}$. For example, the first rectifier unit of the N rectifier units 2 outputs the first DC power $P_{A1}$, and the N-th rectifier unit of the N rectifier units 2 outputs the N-th DC power $P_{AN}$.

The N power converters 3 are connected with the N rectifier units 2 in a one-to-one relationship. That is, each power converter 3 is electrically connected with a corresponding rectifier unit 2. Each power converter 3 includes an input terminal 31, a first output terminal 32 and a second output terminal 33. The input terminal 31 of each power converter 3 is electrically connected with the output terminal 22 of the corresponding rectifier unit 2 to receive the DC power $P_{Ai}$ from the corresponding rectifier unit 2. The first output terminal 32 of the first power converter 3 and the second output terminal 33 of the N-th power converter 3 are connected in parallel to form the N-th total output terminal 4. The N-th total output terminal 4 outputs the N-th total output power $P_{oN}$. The first output terminal 32 of the i-th power converter 3 and the second output terminal 33 of the (i−1)-th power converter 3 are connected in parallel to form the (i−1)-th total output terminal 4, wherein i is an integer greater than or equal to 2 and less than N, and N is an integer. The (i−1)-th total output terminal 4 outputs the (i−1)-th total output power $P_{o(i-1)}$. For example, if i is 2, the first output terminal 32 of the second power converter 3 and the second output terminal 33 of the first power converter 3 are connected in parallel to form the first total output terminal 4. The first total output terminal 4 outputs the first total output power $P_{o1}$.

In an embodiment, each power converter 3 includes a first DC/DC conversion circuit 34 and a second DC/DC conversion circuit 35. The first DC/DC conversion circuit 34 has an input terminal 341 and an output terminal 342. The second DC/DC conversion circuit 35 has an input terminal 351 and an output terminal 352. The input terminal 341 of the first DC/DC conversion circuit 34 and the input terminal 351 of the second DC/DC conversion circuit 35 are connected in parallel with the input terminal 31 of the corresponding power converter 3. The input power of each power converter 3 (i.e., the DC power $P_{Ai}$ outputted from the corresponding rectifier unit 2) is equal to the input power of the first DC/DC conversion circuit 34 plus the input power of the second DC/DC conversion circuit 35. The output terminal 342 of the first DC/DC conversion circuit 34 is electrically connected to the first output terminal 32 of the corresponding power converter 3. The output terminal 352 of the second DC/DC conversion circuit 35 is electrically connected to the second output terminal 33 of the corresponding power converter 3.

As mentioned above, the N power converters of the power conversion system 1 outputs N total output powers to N loads (not shown) through the N total output terminals 4. When compared with the first conventional power conversion system with a single total output port, the power conversion system 1 of the present disclosure includes multiple total output ports. Moreover, the power conversion system 1 is cost-effective and has high charging efficiency. In the power conversion system 1, the first output terminal 32 of the first power converter 3 and the second output terminal 33 of the N-th power converter 3 are connected in parallel, and the first output terminal 32 of the i-th power converter 3 and the second output terminal 33 of the (i−1)-th power converter 3 are connected in parallel. Consequently, the N power converters 3 are connected with each other in a circular arrangement. If the required power levels for different total output terminals 4 are different, the input power levels at the input terminals 31 of the power converters 3 may be regulated to be consistent according to the practical requirements. In other words, the power conversion system 1 can meet the power factor requirements. Consequently, the efficiency of the power conversion system 1 is increased, and the power loss is reduced.

Figure 3:
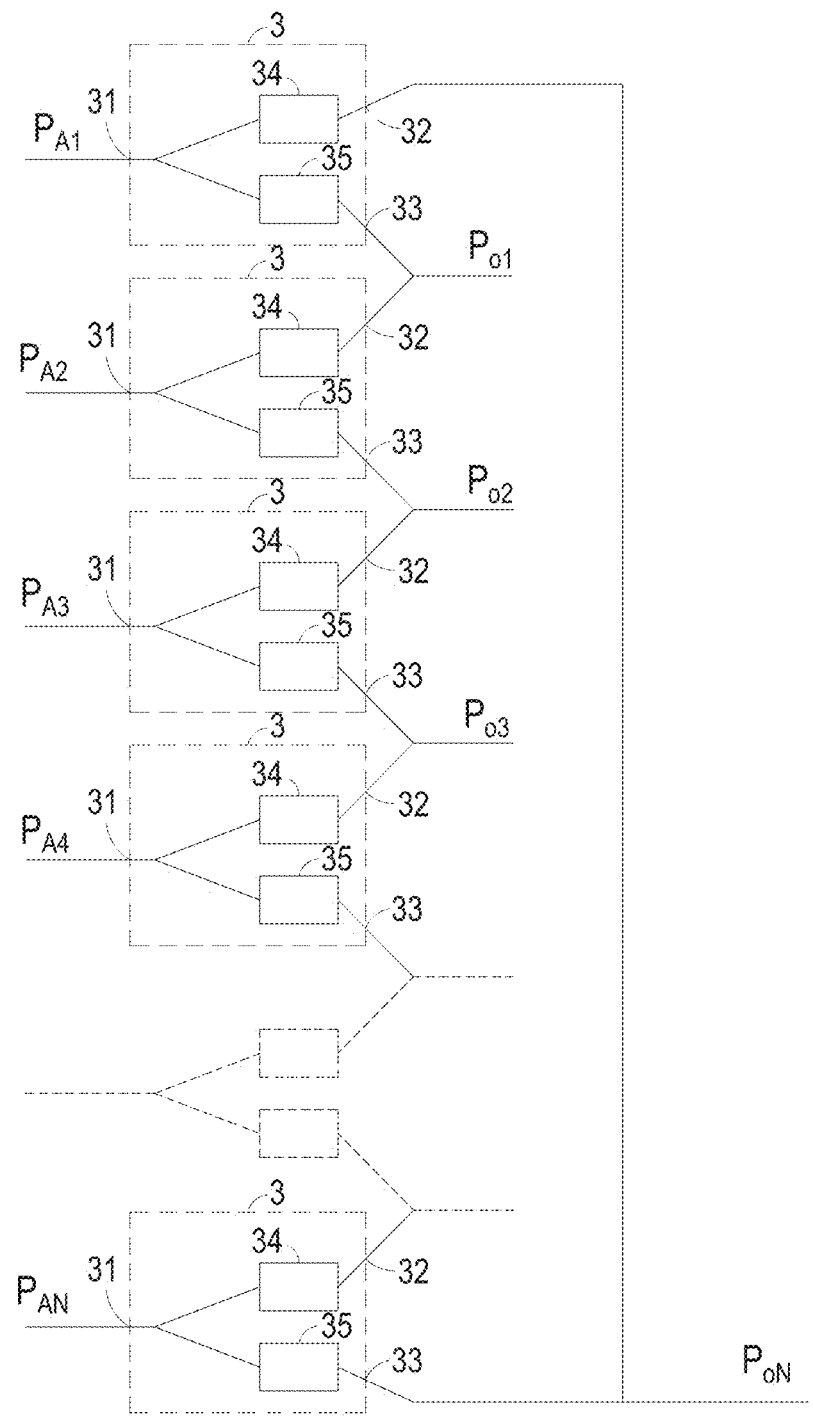
FIG. 3 schematically illustrates the power distribution of the power converters of the power conversion system as shown in FIG. 1.

FIG. 3 schematically illustrates the power distribution of the power converters of the power conversion system as shown in FIG. 1. Please refer to FIGS. 1, 2 and 3. The i-th total output power $P_{oi}$ outputted from the i-th total output terminal 4 is equal to the output power from the second output terminal 33 of the i-th power converter 3 plus the output power from the first output terminal 32 of the (i+1)-th power converter 3. For example, the first total output power $P_{o1}$ outputted from the first total output terminal 4 is equal to the output power from the second output terminal 33 of the first power converter 3 plus the output power from the first output terminal 32 of the second power converter 3. Similarly, the N-th total output power $P_{oN}$ outputted from the N-th total output terminal 4 is equal to the output power from the second output terminal 33 of the N-th power converter 3 plus the output power from the first output terminal 32 of the first power converter 3. In other words, the output power from the first output terminal 32 of the i-th power converter 3 is equal to a half of the (i−1)-th total output power $P_{o(i-1)}$ outputted from the (i−1)-th total output terminal 4 minus an (i−1)-th power error value, and the output power from the second output terminal 33 of the i-th power converter 3 is equal to a half of the i-th total output power $P_{oi}$ outputted from the i-th total output terminal 4 plus an i-th power error value. Moreover, the output power from the first output terminal 32 of the first power converter 3 is equal to a half of the N-th total output power $P_{oN}$ outputted from the N-th total output terminal 4 minus the N-th power error value, and the output power from the second output terminal 33 of the first power converter 3 is equal to a half of the first total output power $P_{o1}$ outputted from the first total output terminal 4 plus the first power error value.

The above power error values (i.e., from the first power error value to the N-th power error value) are the decision variables to be solved. After the power error values are solved, the output powers from the first output terminals 32 and the second output terminals 33 of all power converters 3 are determined. Consequently, the input powers of the input terminals 31 of all power converters 3 can be adjusted to be equal. In case that the input powers of the input terminals 31 of all power converters 3 are equal, the above power error values (i.e., from the first power error value to the N-th power error value) can be regulated according to the following mathematic formulae. Consequently, the circulation power or the power loss of the power conversion system 1 can be minimized. Hereinafter, the target function of the following mathematic formulae is used to achieve the minimum circulation power.

As mentioned above, it is necessary to perform the minimum power dispatch of the power converters 3 in order to minimize the circulation power and the power loss of the power conversion system 1. In accordance with a feature of the present disclosure, the target function may be expressed by the mathematic formula (1):

$$\min_{x_1,\dots,x_N} J = \sum_{n=1}^{N} x_n^2, n = 1, 2, \dots, N \qquad (1)$$

In the above mathematic formula, min is the minimum value, J is the target function, $x_1, x_2, \dots, x_N$ are the to-be-solved circulation power values (i.e., the power error values from the first power error value to the N-th power error value).

For achieving the balance between the input power and the output power of each power converter 3, the input power of the input terminal 31 of each power converter 3 is equal to the output power from the first output terminal 32 plus the output power from the second output terminal 33. That is, the associated powers may be expressed by the following mathematic formula (2):

$$s.t. P_{An} = 0.5 P_{on} + x_n + 0.5 P_{o(n-1)} - x_{n-1}, n=1,2,\dots,N \qquad (2)$$

In the above mathematic formula, s.t. is the abbreviation of the term "subject to", i.e., the constraint condition. After n=1, 2, ..., N are substituted into $P_{An}$, the terms $P_{A1}, P_{A2}, \dots, P_{AN}$ denote the input powers of the input terminals 31 of N power converters 3. After n=1, 2, ..., N are substituted into $P_{on}$ and $P_{o(n-1)}$, the terms $P_{o1}, P_{o2}, \dots, P_{oN}$ denote the total output powers from the N total output terminals 4. After n=1, 2, ..., N are substituted into $x_n$ and $x_{n-1}$, the terms $x_1, x_2, \dots, x_N$ denote the to-be-solved circulation power values (i.e., the power error values from the first power error value to the N-th power error value).

In order to achieve the consistency constraint between the input powers of the N power converters 3, the input power of each power converter 3 should be equal to the average value of the input powers of the N power converters 3. The associated powers may be expressed by the following mathematic formula (3):

$$P_{An} = \overline{P}, n=1,2,\dots,N \qquad (3)$$

After n=1, 2, ..., N are substituted into $P_{An}$, the terms $P_{A1}, P_{A2}, \dots, P_{AN}$ denote the input powers of the input terminals 31 of N power converters 3. Moreover, P denotes the average value of the input powers of the input terminals 31 of the N power converters 3.

Generally, since the power conversion system 1 has the inherent rated power capacity, the power of the power conversion system 1 is limited. In order to reasonably utilize the power capacity of the power conversion system 1, the power limit value of each power converter 3 is designed to be a half of the total power capacity of the power conversion system 1. For achieving this purpose, the to-be-solved circulation power values (i.e., the power error values from the first power error value to the N-th power error value) should not be too large. Consequently, the circulation current power will not exceed the power limit value of the power converter 3. That is, the associated powers may be expressed by the following mathematic formula (4):

$$|x_n| \leq P_{Limit} - 0.5 P_{on}, n=1,2,\dots,N \qquad (4)$$

After n=1, 2, ..., N are substituted into $x_n$, the terms $x_1, x_2, \dots, x_N$ denote the to-be-solved circulation power values (i.e., the power error values from the first power error value to the N-th power error value). Moreover, $P_{Limit}$ denotes the power limit value of the power converter 3. After n=1, 2, ..., N are substituted into $P_{on}$, the terms $P_{o1}$, $P_{o2}$, ..., $P_{oN}$ denote the total output powers from the corresponding total output terminals 4.

By computing the above equations (1) to (4), the following mathematic formulae (5) and (6) can be obtained according to an analytical method.

$$x_1 = \frac{1}{N}\sum_{i=1}^{N}(N-i)(0.5(P_{oi} - P_{o(i+1)}) - \overline{P}) \qquad (5)$$

$$x_i = x_{i-1} - 0.5(P_{oi} + P_{o(i-1)}), i = 2, \ldots, N \qquad (6)$$

In the above mathematic formulae, $x_1$ is the first power error value, $P_{oi}$ is the i-th total output power, and $P_{o(i+1)}$ is the (i+1)-th total output power, wherein $P_{o(i+1)}$ is $P_{o1}$ when i=N. Moreover, $\overline{P}$ denotes the average value of the N total output powers, $x_i$ is the i-th power error value, $x_{i-1}$ is the (i−1)-th power error value, and $P_{o(i-1)}$ is the (i−1)-th total output power.

From the above mathematic formulae (5) and (6), the first power error value $x_1$ can be firstly derived, and then the power error values $x_2$ to $x_N$ can be obtained in sequence.

Figure 4:
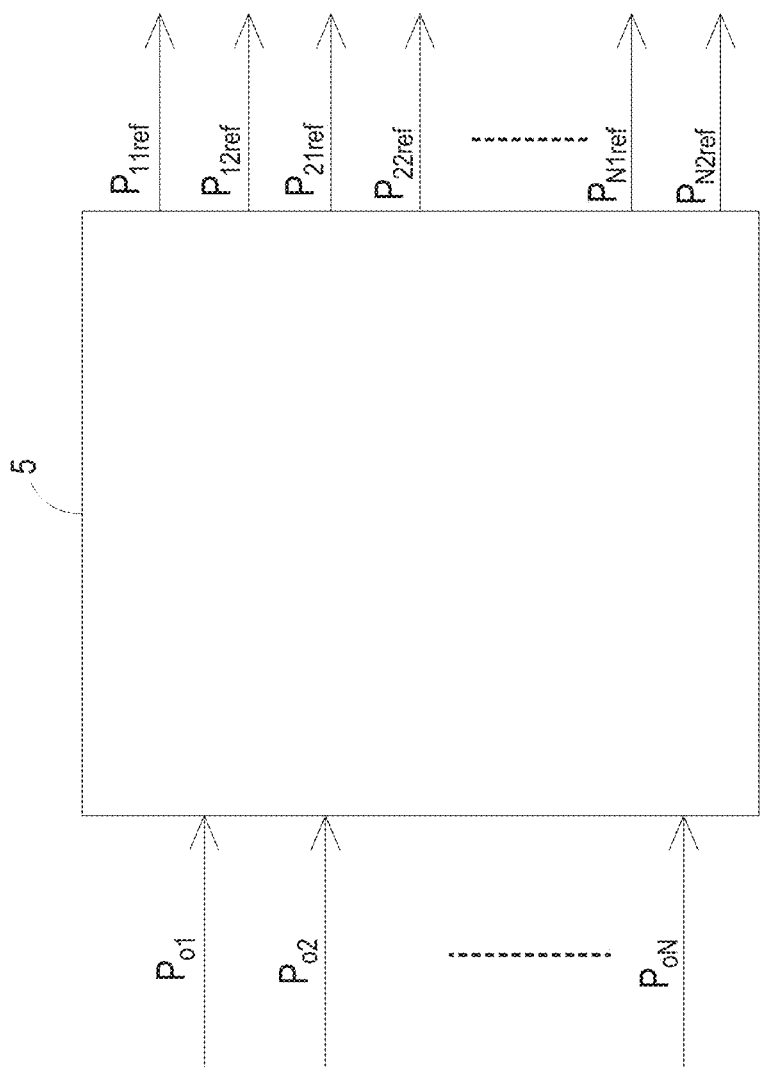
FIG. 4 schematically illustrates the computation of a computing control unit of the power conversion system as shown in FIG. 1.

Please refer to FIGS. 1, 2 and 4. FIG. 4 schematically illustrates the computation of a computing control unit of the power conversion system as shown in FIG. 1. The power conversion system 1 further includes a computing control unit 5. The computing control unit 5 is electrically connected with the total output terminals 4 of the N power converters 3 to receive the N total output powers $P_{o1}, \ldots, P_{oN}$ from the N power converters 3. Preferably but not exclusively, the computing control unit 5 is a centralized controller. According to the mathematic formulae (5) and (6), the computing control unit 5 acquires the first power error value $x_1$ to the N-th power error value $x_N$. In addition, the computing control unit 5 acquires the input power reference values of the first DC/DC conversion circuit 34 and the second DC/DC conversion circuit 35 of each power converter 3 according to the first power error value $x_1$ to the N-th power error value $x_N$. The input power reference value $P_{n1ref}$ of the first DC/DC conversion circuit 34 of each power converter 3 may be expressed as: $P_{n1ref}=0.5\ P_{o(n-1)}-x_n$, wherein 1≤n≤N. In case that n=1, $P_{o(n-1)}=P_{o0}$, and $P_{o0}$ is $P_{oN}$. The input power reference value $P_{n2ref}$ of the second DC/DC conversion circuit 35 of each power converter 3 may be expressed as: $P_{n2ref}=0.5P_{on}+x_n$. For example, the input power reference value $P_{11ref}$ of the first DC/DC conversion circuit 34 of the first power converter 3 may be expressed as: $P_{11ref}=0.5P_{oN}-x_1$, and the input power reference value $P_{12ref}$ of the second DC/DC conversion circuit 35 of the first power converter 3 may be expressed as: $P_{12ref}=0.5P_{o1}+x_1$. Moreover, the output power from the first DC/DC conversion circuit 34 of each power converter 3 is controlled according to the input power reference value of the first DC/DC conversion circuit 34, and the output power from the second DC/DC conversion circuit 35 of each power converter 3 is controlled according to the input power reference value of the second DC/DC conversion circuit 35. In such way, the input powers of the input terminals 31 of the plurality of power converters 3 can be regulated to be identical. Consequently, the circulation power or the power loss of the power conversion system 1 can be minimized.

However, in some situations, the unbalance of the output powers from the total output terminals of the plurality of power converters 3 is serious because of the inherent power limitation of the power conversion system 1. Consequently, the input powers of the input terminals 31 of the plurality of power converters 3 can't be regulated to be completely consistent. Under this circumstance, it is only able to regulate the input powers of the input terminals 31 of the plurality of power converters 3 to be as consistent as possible. Consequently, the above mathematic formula (3) is no longer used as a restriction for the optimization of the power error values. The mathematic formula (1) needs to be rewritten as the mathematic formula (7):

$$\min_{x_1,\ldots,x_N} J = \sum_{n=1}^{N} x_n^2 + \rho \sum_{n=1}^{N}(P_{An} - \overline{P})^2, n = 1, 2, \ldots, N \qquad (7)$$

In the above mathematic formula, min is the minimum value, J is the target function, $x_1, x_2, \ldots, x_N$ are the to-be-solved circulation power values (i.e., the first power error value to the N-th power error value), and $\rho$ is a weighting coefficient. The weighting coefficient $\rho$ is set by the computing control unit 5 according to the circuit characteristics of the power conversion system 1. If the value of the weighting coefficient $\rho$ is larger, the input power consistency is better. After n=1, 2, ..., N are substituted into $P_{An}$, the terms $P_{A1}, P_{A2}, \ldots, P_{AN}$ denote the input powers of the input terminals 31 of N power converters 3. Moreover, P denotes the average value of the input powers of the input terminals 31 of the N power converters 3.

By computing the above equations (1), (2) and (7), the following mathematic formula (8) can be obtained according to an analytical method.

$$x = A^{-1}b, \qquad (8)$$

$$A = \begin{bmatrix} 1+2\rho & -\rho & 0 & \ldots & -\rho \\ -\rho & 1+2\rho & -\rho & \ldots & \ldots \\ 0 & -\rho & 1+2\rho & -\rho & \ldots \\ \ldots & \ldots & \ldots & \ldots & \ldots \\ -\rho & 0 & \ldots & -\rho & 1+2\rho \end{bmatrix},$$

$$b = \begin{bmatrix} 0.5\rho(P_{o2} - P_{oN}) \\ 0.5\rho(P_{o3} - P_{o1}) \\ \ldots \\ 0.5\rho(P_{o1} - P_{o(N-1)}) \end{bmatrix}$$

In the above mathematic formula, $x=[x_1, x_2, \ldots, x_i, \ldots, x_N]^T$, $x_i$ is the i-th power error value, $P_{oi}$ is the i-th total output power, and $\rho$ is a weighting coefficient. The weighting coefficient $\rho$ is set by the computing control unit 5 according to the circuit characteristics of the power conversion system 1. After A and b are substituted into $x=A^{-1}b$, x is obtained.

According to the mathematic formula (8), the computing control unit 5 acquires the first power error value $x_1$ to the N-th power error value $x_N$. In addition, the computing control unit 5 controls the output powers from the first output terminals 32 and the second output terminals 33 of the N power converters 3 according to the first power error value $x_1$ to the N-th power error value $x_N$. In such way, the input powers of the input terminals 31 of the plurality of power converters 3 can be regulated to be identical. Consequently, the circulation power or the power loss of the power conversion system 1 can be minimized.

In some embodiments, the computing control unit 5 further determines whether the first power error value $x_1$ to the N-th power error value $x_N$ comply with the mathematic formula (4), and the computing control unit 5 further controls the first power error value $x_1$ to the N-th power error value $x_N$ according to the mathematic formula (4).

$$|x_n| \leq P_{Limit} - 0.5 P_{on}, n=1,2, \ldots ,N \quad (4)$$

That is, the computing control unit 5 determines whether one of the power error values is greater than an upper error limit or lower than a lower error limit. The upper error limit is equal to $P_{Limit} - 0.5 P_{on}$, and the lower error limit is equal to $-(P_{Limit} - 0.5 P_{on})$. If a specified power error value of the first power error value $x_1$ to the N-th power error value $x_N$ is greater than the upper error limit, the computing control unit 5 adjusts the specified power error value to the upper error limit. Whereas, if a specified power error value of the first power error value $x_1$ to the N-th power error value $x_N$ is lower than the lower error limit, the computing control unit 5 adjusts the specified power error value to the lower error limit.

Figure 5:
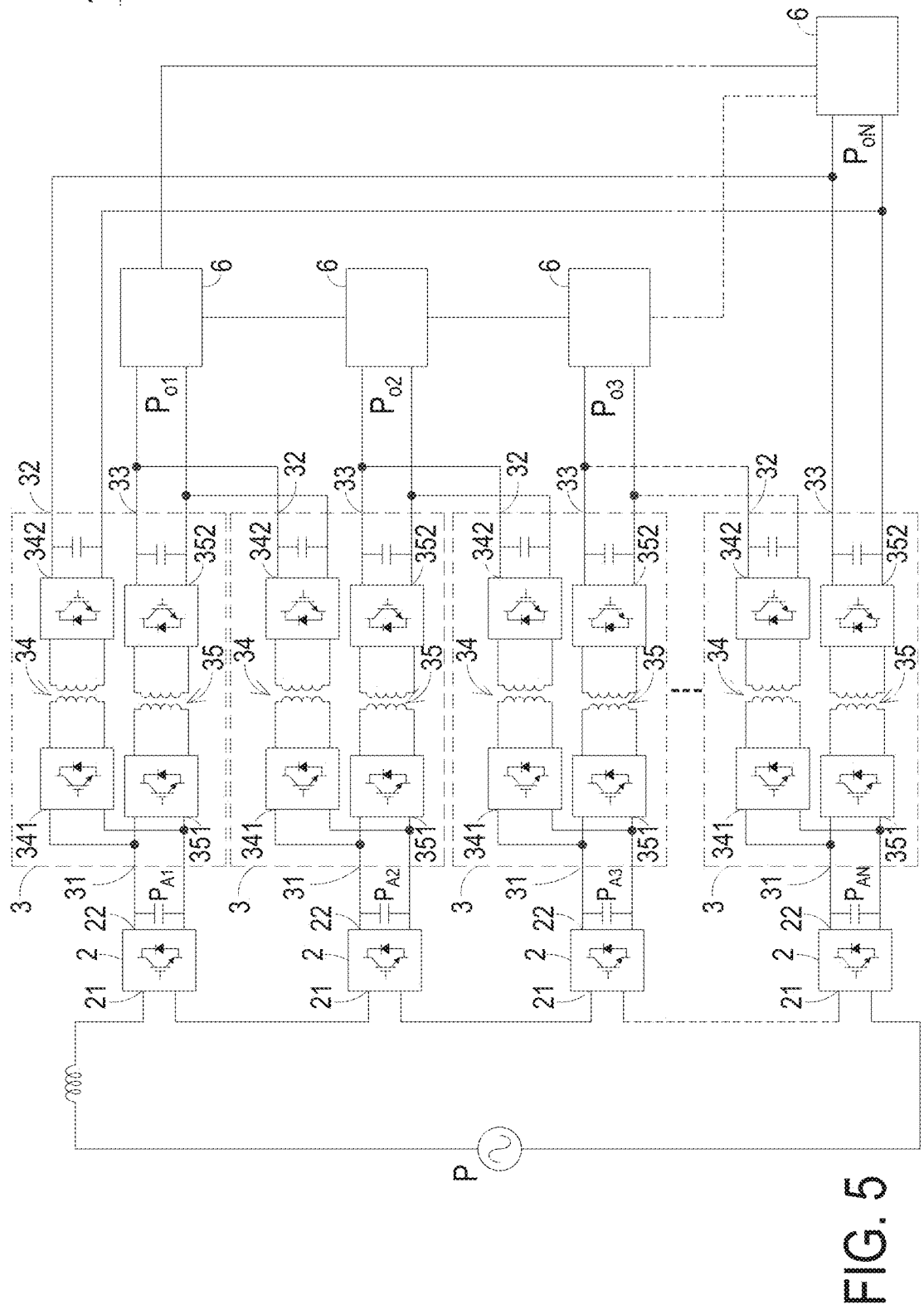
FIG. 5 is a schematic circuit block diagram illustrating a power conversion system according to a second embodiment of the present disclosure.
Figure 6:
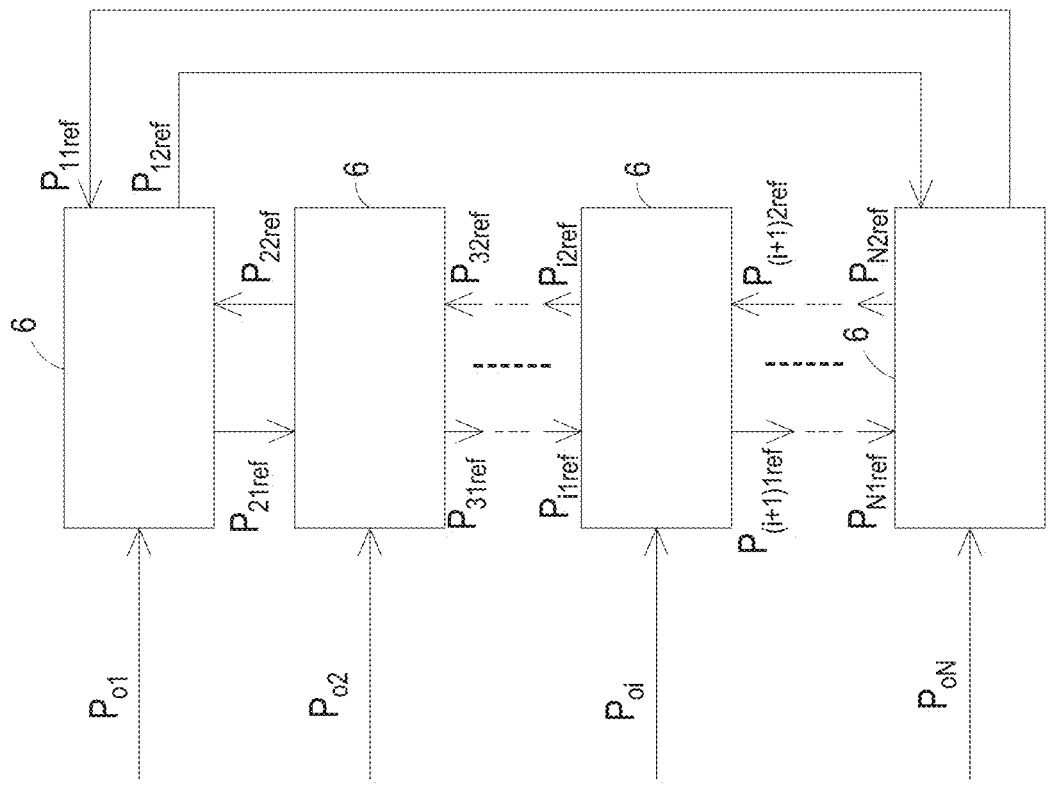
FIG. 6 schematically illustrates the relationships between associated powers and the port controllers of the power conversion system as shown in FIG. 5.

Please refer to FIGS. 5 and 6. FIG. 5 is a schematic circuit block diagram illustrating a power conversion system according to a second embodiment of the present disclosure. FIG. 6 schematically illustrates the relationships between associated powers and the port controllers of the power conversion system as shown in FIG. 5. The power conversion system 1a of this embodiment is similar to the power conversion system 1 of the first embodiment as shown in FIG. 1. In comparison with the power conversion system 1 of the first embodiment, the power conversion system 1a of this embodiment is not equipped with the computing control unit but is equipped with N port controllers 6. The N port controllers 6 are electrically connected with the total output terminals 4 of the corresponding power converters 3 to receive the corresponding total output powers. The first port controller 6 is electrically connected with the N-th port controller 6 and the second port controller 6. The i-th port controller 6 is electrically connected with the (i−1)-th port controller 6 and the (i+1)-th port controller 6. For example, the second port controller 6 is electrically connected with the first port controller 6 and the third port controller 6. Moreover, each port controller 6 also receives the input power reference values from the connected port controllers 6 and issues the corresponding input power reference values to the connected port controllers 6.

The first port controller 6 receives the first total output power $P_{o1}$ from the first total output terminal 4, the input power reference value $P_{11ref}$ form the N-th port controller 6 and the input power reference value $P_{22ref}$ from the second port controller 6. Moreover, the first port controller 6 issues the input power reference values $P_{12ref}$ and $P_{21ref}$ to the N-th port controller 6 and the second port controller 6. The i-th port controller 6 receives the i-th total output power $P_{oi}$ from the i-th total output terminal 4, the input power reference value $P_{i1ref}$ form the (i−1)-th port controller 6 and the input power reference value $P_{(i+1)2ref}$ from the (i+1)-th port controller 6. Moreover, the i-th port controller 6 issues the input power reference values $P_{i2ref}$ and $P_{(i+1)1ref}$ to the (i−1)-th port controller 6 and the (i+1)-th port controller 6. The N-th port controller 6 receives the N-th total output power $P_{oN}$ from the N-th total output terminal 4, the input power reference value $P_{N1ref}$ form the (N−1)-th port controller 6 and the input power reference value $P_{12ref}$ from the first port controller 6. Moreover, the N-th port controller 6 issues the input power reference values $P_{N2ref}$ and $P_{11ref}$ to the (N−1)-th port controller 6 and the first port controller 6.

From the above descriptions, the N port controllers 6 are in communication with each other to acquire the input power reference values from the corresponding power converters. The output powers of the corresponding power converters are corrected according to the received input power reference values through iteration computations. In such way, the input powers of the input terminals 31 of the plurality of power converters 3 can be regulated to be as consistent as possible. Consequently, the circulation power or the power loss of the power conversion system 1a can be minimized.

Figure 7:
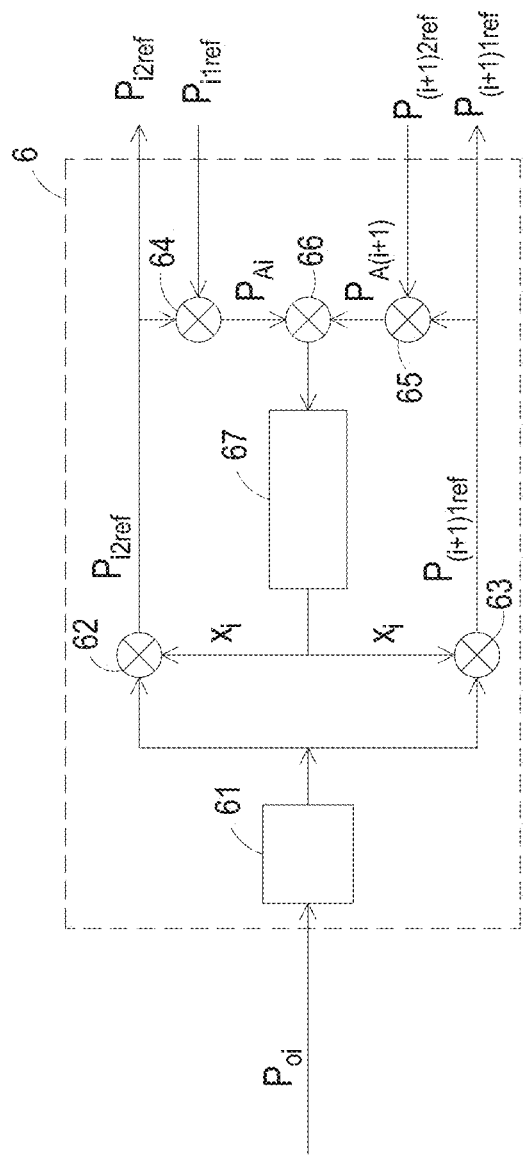
FIG. 7 is a schematic circuit diagram illustrating the detailed circuitry structure of a port controller in the power conversion system as shown in FIG. 5.

Please refer to FIGS. 5, 6 and 7. FIG. 7 is a schematic circuit diagram illustrating the detailed circuitry structure of a port controller in the power conversion system as shown in FIG. 5. The circuitry structures of the N port controllers 6 are identical. For illustration, only one port controller 6 is shown in FIG. 7. Each port controller 6 includes a first proportional unit 61, a first adder 62, a first subtractor 63, a second adder 64, a third adder 65, a second subtractor 66, and a power coordinator 67.

The first proportional unit 61 of the first port controller 6 is electrically connected to the first total output terminal 4 to receive the first total output power $P_{o1}$ from the first total output terminal 4. Moreover, after the first total output power $P_{o1}$ is multiplied by 0.5, the first proportional unit 61 obtains a first intermediate variable. The first adder 62 of the first port controller 6 is electrically connected to the first proportional unit 61 of the first port controller 6 and the N-th port controller 6 to receive the first intermediate variable and the first power error value $x_1$. After the first intermediate variable and the first power error value $x_1$ are added, the input power reference value $P_{12ref}$ corresponding to the second DC/DC conversion circuit 35 of the first power converter 3 is obtained by the first adder 62 of the first port controller 6 and transmitted to the N-th port controller 6. The first subtractor 63 of the first port controller 6 is electrically connected to the first proportional unit 61 of the first port controller 6 and the second port controller 6 to receive the first intermediate variable and the first power error value $x_1$. After the first power error value $x_1$ is subtracted from the first intermediate variable, the input power reference value $P_{21ref}$ corresponding to the first DC/DC conversion circuit 34 of the second power converter 3 is obtained by the first subtractor 63 and transmitted to the second port controller 6. The second adder 64 of the first port controller 6 is electrically connected to the first adder 62 of the first port controller 6 and the N-th port controller 6 to receive the input power reference value $P_{12ref}$ from the first adder 62 of the first port controller 6 and the input power reference value $P_{11ref}$ from the N-th port controller 6. After the input power reference values $P_{12ref}$ and $P_{11ref}$ are added, the second adder 64 of the first port controller 6 obtains the input power of the input terminal 31 of the first power converter 3 (i.e., the first DC power $P_{A1}$). The third adder 65 of the first port controller 6 is electrically connected with the first subtractor 63 of the first port controller 6 and the second port controller 6 to receive the input power reference value $P_{21ref}$ from the first subtractor 63 of the first port controller 6 and the input power reference value $P_{22ref}$ from the second port controller 6. After the input power reference values $P_{21ref}$ and $P_{22ref}$ are added, the third adder 65 obtains the input power of the input terminal 31 of the first power converter 3 (i.e., the second DC power $P_{A2}$). The second subtractor 66 of the first port controller 6 is electrically connected to the second adder 64 and the third adder 65 to receive the first DC power $P_{A1}$ from the second adder 64 and the second DC power $P_{A2}$ from the third adder 65. After the first DC power $P_{A1}$ is subtracted from the second DC power $P_{A2}$, the second subtractor 66 obtains a first power variable. The power coordinator 67 of the first port controller 6 is electrically connected with the second subtractor 66, the first adder 62 and the first subtractor 63 to receive the first power variable from the second subtractor 66 and issues the first power error value $x_1$ to the first adder 62 and the first subtractor 63.

The first proportional unit 61 of the i-th port controller 6 is electrically connected to the i-th total output terminal 4 to receive the i-th total output power $P_{oi}$ from the i-th total output terminal 4. Moreover, after the i-th total output power $P_{oi}$ is multiplied by 0.5, the first proportional unit 61 obtains an i-th intermediate variable. The first adder 62 of the i-th port controller 6 is electrically connected to the first proportional unit 61 of the i-th port controller 6 and the (i−1)-th port controller 6 to receive the i-th intermediate variable and the i-th power error value $x_i$. After the i-th intermediate variable and the i-th power error value $x_i$ are added, the input power reference value $P_{i2ref}$ corresponding to the second DC/DC conversion circuit 35 of the i-th power converter 3 is obtained by the first adder 62 of the i-th port controller 6 and transmitted to the (i−1)-th port controller 6. The first subtractor 63 of the i-th port controller 6 is electrically connected to the first proportional unit 61 of the i-th port controller 6 and the (i+1)-th port controller 6 to receive the i-th intermediate variable and the i-th power error value $x_i$. After the i-th power error value $x_i$ is subtracted from the i-th intermediate variable, the input power reference value $P_{(i+1)1ref}$ corresponding to the first DC/DC conversion circuit 34 of the (i+1)-th power converter 3 is obtained by the first subtractor 63 and transmitted to the (i+1)-th port controller 6. The second adder 64 of the i-th port controller 6 is electrically connected to the first adder 62 of the i-th port controller 6 and the (i−1)-th port controller 6 to receive the input power reference value $P_{i2ref}$ from the first adder 62 of the i-th port controller 6 and the input power reference value $P_{i1ref}$ from the (i−1)-th port controller 6. After the input power reference values $P_{i2ref}$ and $P_{i1ref}$ are added, the second adder 64 of the i-th port controller 6 obtains the input power of the input terminal 31 of the i-th power converter 3 (i.e., the i-th DC power $P_{Ai}$). The third adder 65 of the i-th port controller 6 is electrically connected with the first subtractor 63 of the i-th port controller 6 and the (i+1)-th port controller 6 to receive the input power reference value $P_{(i+1)1ref}$ from the first subtractor 63 of the i-th port controller 6 and the input power reference value $P_{(i+1)2ref}$ from the (i+1)-th port controller 6. After the input power reference values $P_{(i+1)1ref}$ and $P_{(i+1)2ref}$ are added, the third adder 65 of the i-th port controller 6 obtains the input power of the input terminal 31 of the first power converter 3 (i.e., the (i+1)-th DC power $P_{A(i+1)}$). The second subtractor 66 of the i-th port controller 6 is electrically connected to the second adder 64 and the third adder 65 to receive the i-th DC power $P_{Ai}$ from the second adder 64 and the (i+1)-th DC power $P_{A(i+1)}$ from the third adder 65. After the i-th DC power $P_{Ai}$ is subtracted from the (i+1)-th DC power $P_{A(i+1)}$, the second subtractor 66 of the i-th port controller 6 obtains an i-th power variable. The power coordinator 67 of the i-th port controller 6 is electrically connected with the second subtractor 66, the first adder 62 and the first subtractor 63 to receive the i-th power variable from the second subtractor 66 and issues the i-th power error value $x_i$ to the first adder 62 and the first subtractor 63.

The first proportional unit 61 of the N-th port controller 6 is electrically connected to the N-th total output terminal 4 to receive the N-th total output power $P_{oN}$ from the N-th total output terminal 4. Moreover, after the N-th total output power $P_{oN}$ is multiplied by 0.5, the first proportional unit 61 obtains an N-th intermediate variable. The first adder 62 of the N-th port controller 6 is electrically connected to the first proportional unit 61 of the N-th port controller 6 and the (N−1)-th port controller 6 to receive the N-th intermediate variable and the N-th power error value $x_N$. After the N-th intermediate variable and the N-th power error value $x_N$ are added, the input power reference value $P_{N2ref}$ corresponding to the second DC/DC conversion circuit 35 of the N-th power converter 3 is obtained by the first adder 62 of the N-th port controller 6 and transmitted to the (N−1)-th port controller 6. The first subtractor 63 of the N-th port controller 6 is electrically connected to the first proportional unit 61 of the N-th port controller 6 and the first port controller 6 to receive the N-th intermediate variable and the N-th power error value $x_N$. After the N-th power error value $x_N$ is subtracted from the N-th intermediate variable, the input power reference value $P_{11ref}$ corresponding to the first DC/DC conversion circuit 34 of the first power converter 3 is obtained by the first subtractor 63 and transmitted to the first port controller 6. The second adder 64 of the N-th port controller 6 is electrically connected to the first adder 62 of the N-th port controller 6 and the (N−1)-th port controller 6 to receive the input power reference value $P_{N2ref}$ from the first adder 62 of the N-th port controller 6 and the input power reference value $P_{N1ref}$ from the (N−1)-th port controller 6. After the input power reference values $P_{N2ref}$ and $P_{N1ref}$ are added, the second adder 64 of the N-th port controller 6 obtains the input power of the input terminal 31 of the N-th power converter 3 (i.e., the N-th DC power $P_{AN}$). The third adder 65 of the N-th port controller 6 is electrically connected with the first subtractor 63 of the N-th port controller 6 and the first port controller 6 to receive the input power reference value $P_{11ref}$ from the first subtractor 63 of the N-th port controller 6 and the input power reference value $P_{12ref}$ from the first port controller 6. After the input power reference values $P_{11ref}$ and $P_{12ref}$ are added, the third adder 65 of the N-th port controller 6 obtains the input power of the input terminal 31 of the first power converter 3 (i.e., the first DC power $P_{A1}$). The second subtractor 66 of the N-th port controller 6 is electrically connected to the second adder 64 and the third adder 65 to receive the N-th DC power $P_{AN}$ from the second adder 64 and the first DC power $P_{A1}$ from the third adder 65. After the N-th DC power $P_{AN}$ is subtracted from the first DC power $P_{A1}$, the second subtractor 66 of the N-th port controller 6 obtains an N-th power variable. The power coordinator 67 of the N-th port controller 6 is electrically connected with the second subtractor 66, the first adder 62 and the first subtractor 63 to receive the N-th power variable from the second subtractor 66 and issues the N-th power error value $x_N$ to the first adder 62 and the first subtractor 63.

Figure 8:
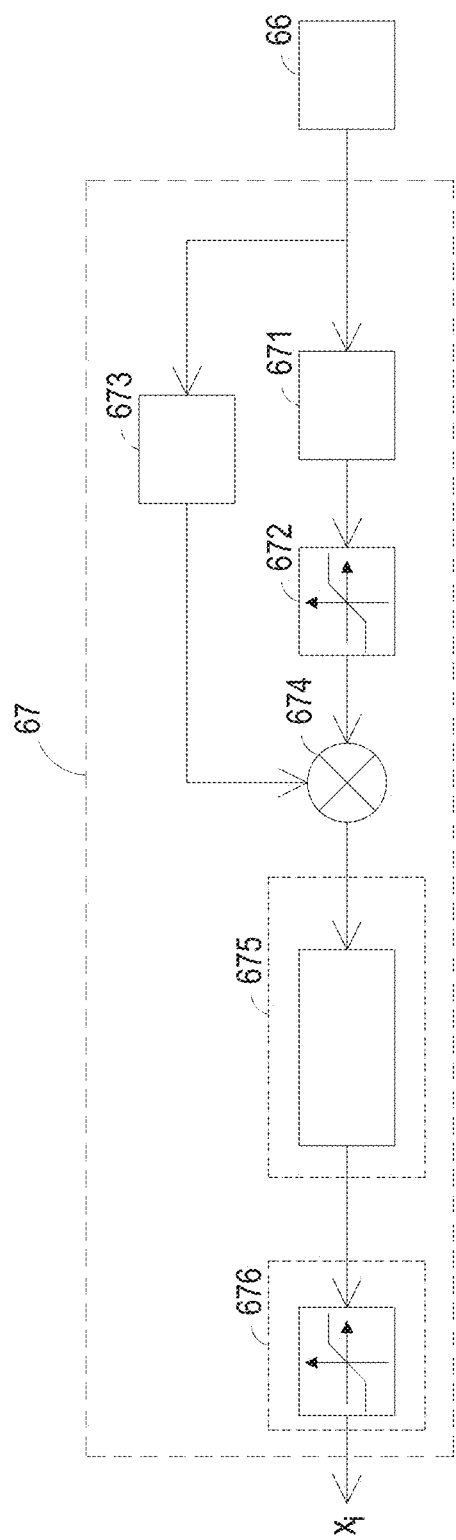
FIG. 8 is a schematic circuit block diagram illustrating the structure of the power coordinator in the port controller as shown in FIG. 7.

Please refer to FIGS. 5, 6, 7 and 8. FIG. 8 is a schematic circuit block diagram illustrating the structure of the power coordinator in the port controller as shown in FIG. 7. The power coordinator 67 of each port controller 6 includes an integration unit 671, an integral limiter 672, a second proportional unit 673, a fourth adder 674, a low-pass filtering unit 675 and a circulation limiter 676.

The integration unit 671 of the first port controller 6 is connected with the second subtractor 66 to receive the first power variable from the second subtractor 66. The integral limiter 672 of the first port controller 6 is connected with the integration unit 671. After the first power variable is processed by the integral unit 671 and the integral limiter 672 of the first port controller 6 sequentially, a first transition variable is obtained. The second proportional unit 673 of the first port controller 6 is connected with the second subtractor 66 to receive the first power variable from the second subtractor 66. After the first power variable is processed by the second proportional unit 673 of the first port controller 6, a second transition variable is obtained. The fourth adder 674 of the first port controller 6 is connected with the integral limiter 672 and the second proportional unit 673 to receive the first transition variable from the integral limiter 672 and the second transition variable from the second proportional unit 673. After the first transition variable and the second proportional unit 673 are added by the fourth adder 674 of the first port controller 6, a third transition variable is obtained. The low-pass filtering unit 675 of the first port controller 6 is connected with the fourth adder 674 to receive the third transition variable from the fourth adder 674. The circulation limiter 676 of the first port controller 6 is connected between the low-pass filtering unit 675 and the first adder 62 and connected between the low-pass filtering unit 675 and the first subtractor 63. After the third transition variable is processed by the low-pass filtering unit 675 and the circulation limiter 676 of the first port controller 6 sequentially, the first power error value $x_1$ is obtained.

The integration unit 671 of the i-th port controller 6 is connected with the second subtractor 66 to receive the i-th power variable from the second subtractor 66. The integral limiter 672 of the i-th port controller 6 is connected with the integration unit 671. After the i-th power variable is processed by the integral unit 671 and the integral limiter 672 of the i-th port controller 6 sequentially, the first transition variable is obtained. The second proportional unit 673 of the i-th port controller 6 is connected with the second subtractor 66 to receive the i-th power variable from the second subtractor 66. After the i-th power variable is processed by the second proportional unit 673 of the i-th port controller 6, the second transition variable is obtained. The fourth adder 674 of the i-th port controller 6 is connected with the integral limiter 672 and the second proportional unit 673 to receive the first transition variable from the integral limiter 672 and the second transition variable from the second proportional unit 673. After the first transition variable from the integral limiter 672 and the second transition variable from the second proportional unit 673 are added by the fourth adder 674 of the i-th port controller 6, the third transition variable is obtained. The low-pass filtering unit 675 of the i-th port controller 6 is connected with the fourth adder 674 to receive the third transition variable from the fourth adder 674. The circulation limiter 676 of the i-th port controller 6 is connected between the low-pass filtering unit 675 and the first adder 62 and connected between the low-pass filtering unit 675 and the first subtractor 63. After the third transition variable is processed by the low-pass filtering unit 675 and the circulation limiter 676 of the i-th port controller 6 sequentially, the i-th power error value $x_i$ is obtained.

The integration unit 671 of the N-th port controller 6 is connected with the second subtractor 66 to receive the N-th power variable from the second subtractor 66. The integral limiter 672 of the N-th port controller 6 is connected with the integration unit 671. After the N-th power variable is processed by the integral unit 671 and the integral limiter 672 of the N-th port controller 6 sequentially, the first transition variable is obtained. The second proportional unit 673 of the N-th port controller 6 is connected with the second subtractor 66 to receive the N-th power variable from the second subtractor 66. After the N-th power variable is processed by the second proportional unit 673 of the N-th port controller 6, the second transition variable is obtained. The fourth adder 674 of the N-th port controller 6 is connected with the integral limiter 672 and the second proportional unit 673 to receive the first transition variable from the integral limiter 672 and the second transition variable from the second proportional unit 673. After the first transition variable and the second proportional unit 673 are added by the fourth adder 674 of the N-th port controller 6, the third transition variable is obtained. The low-pass filtering unit 675 of the N-th port controller 6 is connected with the fourth adder 674 to receive the third transition variable from the fourth adder 674. The circulation limiter 676 of the N-th port controller 6 is connected between the low-pass filtering unit 675 and the first adder 62 and connected between the low-pass filtering unit 675 and the first subtractor 63. After the third transition variable is processed by the low-pass filtering unit 675 and the circulation limiter 676 of the N-th port controller 6 sequentially, the N-th power error value $x_N$ is obtained.

In some embodiments, only some of the total output terminals 4 are connected to the corresponding loads. For example, only M total output terminals 4 of the N total output terminals 4 are connected to M corresponding loads. For reducing the burden of dispatching electric energy among the N power converters 3 of the power conversion system 1, it is necessary to uniformly and dispersedly connect the M loads to the M total output terminals 4, and the M loads are added to the power conversion system 1 in a specific sequence.

Figure 9:
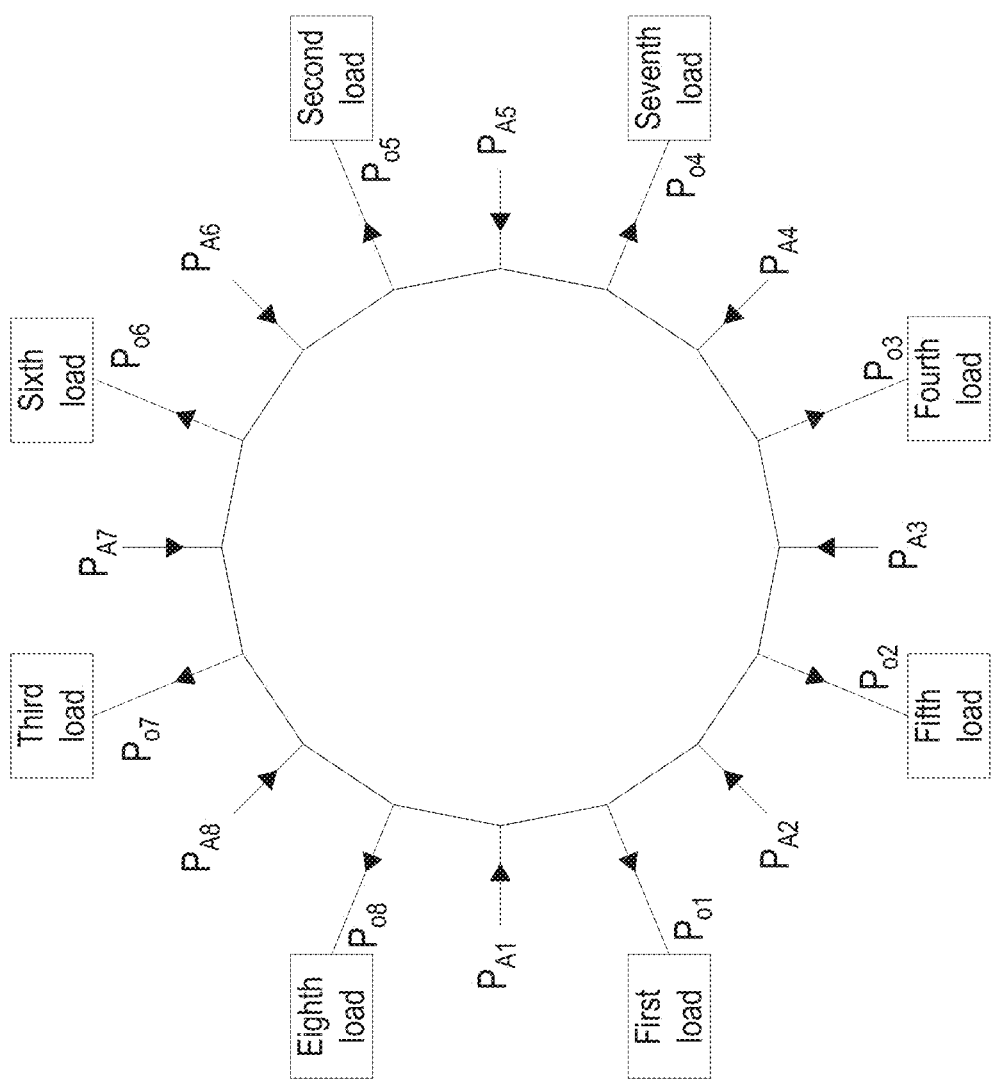
FIG. 9 schematically illustrates a load-adding sequence for the total output terminals of the power conversion system as shown in FIG. 1.

FIG. 9 schematically illustrates a load-adding sequence for the total output terminals of the power conversion system as shown in FIG. 1. For example, according to a setting, M loads are added to the power conversion system 1. If M≤(N/2), the M total output terminals 4 that are connected with the M loads are not adjacent to each other. In an application example, the power conversion system 1 has eight total output terminals 4, and four total output terminals 4 need to be connected to four loads. The first load is connected to the first total output terminal 4 to receive the first total output power $P_{o1}$. The second load is connected to the fifth total output terminal 4 to receive the fifth total output power $P_{o5}$. The third load is connected to the seventh total output terminal 4 to receive the seventh total output power $P_{o7}$. The fourth load is connected to the third total output terminal 4 to receive the third total output power $P_{o3}$. In other words, the first, third, fifth and seventh total output terminals 4 are connected with the corresponding loads, and these total output terminals 4 are not adjacent to each other. It is noted that the connecting relationships between the loads and the total output terminals are not restricted.

If M>(N/2), any two of the M total output terminals 4 that are connected with the M loads are adjacent to each other or separated from each other through one total output terminal 4 that is not connected with any of the M loads. That is, any two of the M total output terminals 4 with loads are separated from each other through one total output terminal 4 without load, or any two of the M total output terminals 4 with loads are adjacent to each other. In an application example, the power conversion system 1 has eight total output terminals 4, and five total output terminals 4 need to be connected to five loads. The first load is connected to the first total output terminal 4 to receive the first total output power $P_{o1}$. The second load is connected to the fifth total output terminal 4 to receive the fifth total output power $P_{o5}$. The third load is connected to the seventh total output terminal 4 to receive the seventh total output power $P_{o7}$. The fourth load is connected to the third total output terminal 4 to receive the third total output power $P_{o3}$. The fifth load is connected to the second total output terminal 4 to receive the second total output power $P_{o2}$. In other words, the first, second, third, fifth and seventh total output terminals 4 are connected with the corresponding loads, and the fourth, sixth and eighth output terminals 4 are not connected with any load. The first, second, third, fifth and seventh total output terminals 4 are adjacent to each other or separated from each other through one total output terminal that is not connected with any of the five loads.

In an application example, the power conversion system 1 has eight total output terminals 4, and eight total output terminals 4 need to be connected to eight loads. The first load is connected to the first total output terminal 4 to receive the first total output power $P_{o1}$. The second load is connected to the fifth total output terminal 4 to receive the fifth total output power $P_{o5}$. The third load is connected to the seventh total output terminal 4 to receive the seventh total output power $P_{o7}$. The fourth load is connected to the third total output terminal 4 to receive the third total output power $P_{o3}$. The fifth load is connected to the second total output terminal 4 to receive the second total output power $P_{o2}$. The sixth load is connected to the sixth total output terminal 4 to receive the sixth total output power $P_{o6}$. The seventh load is connected to the fourth total output terminal 4 to receive the fourth total output power $P_{o4}$. The eighth load is connected to the eighth total output terminal 4 to receive the eighth total output power $P_{o8}$. In other words, the eight total output terminals 4 are all connected with the corresponding loads, and these total output terminals 4 are adjacent to each other.

Figure 10A:
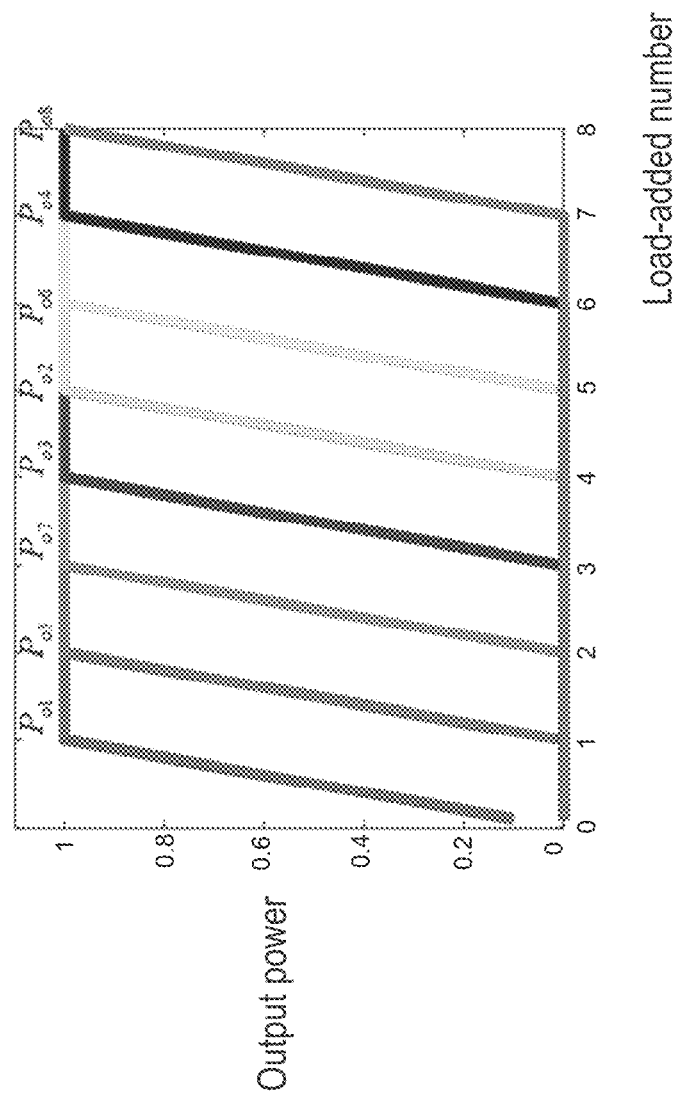
FIG. 10A is a plot illustrating the changes of the output powers from the power conversion system of FIG. 1 according to the load-adding sequence of FIG. 9.
Figure 10B:
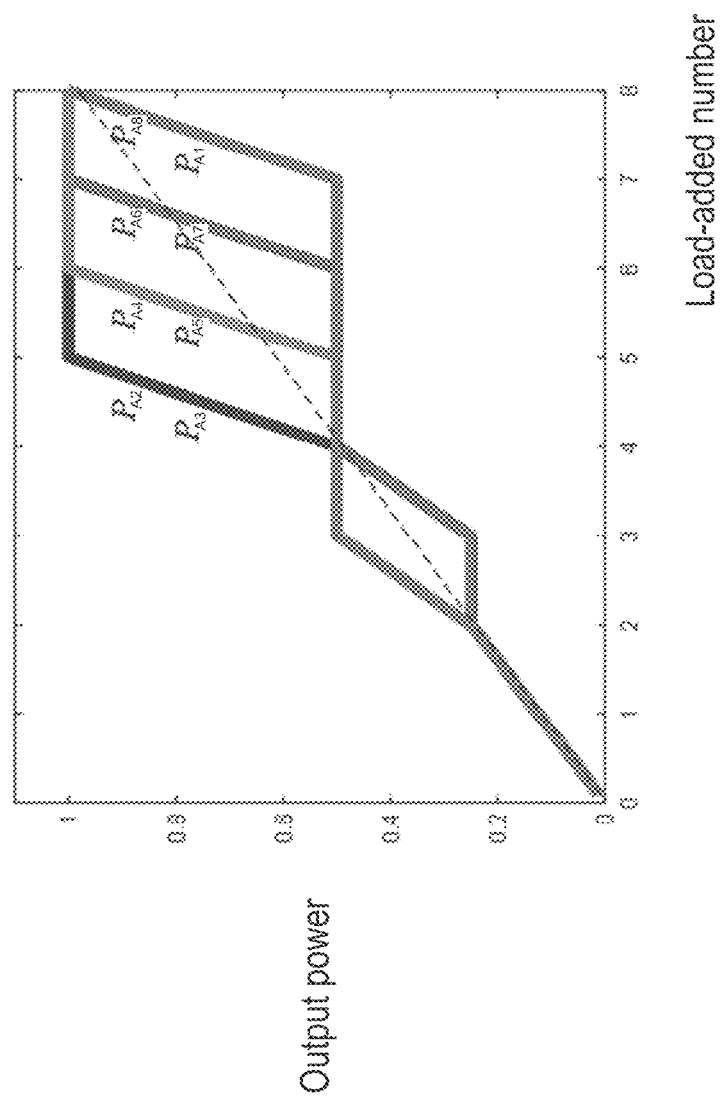
FIG. 10B is a plot illustrating the changes of the input powers of the power conversion system of FIG. 1 according to the load-adding sequence of FIG. 9.

FIG. 10A is a plot illustrating the changes of the output powers from the power conversion system of FIG. 1 according to the load-adding sequence of FIG. 9. FIG. 10B is a plot illustrating the changes of the input powers of the power conversion system of FIG. 1 according to the load-adding sequence of FIG. 9.

Please refer to FIG. 10A. When the load-added number is in the range between 0 and 1, the first load is connected to the first total output terminal 4 to receive the first total output power $P_{o1}$. Consequently, the first load is gradually switched from a no load condition to a full load condition. That is, the first total output power $P_{o1}$ is gradually increased, and the other total output powers are kept zero. When the load-added number reaches 1, the first load is maintained in the full load condition. At the same time, the second load is connected to the fifth total output terminal 4 to receive the fifth total output power $P_{o5}$. When the load-added number is in the range between 1 and 2, the second load is gradually switched from the no load condition to the full load condition. That is, the fifth total output power $P_{o5}$ is gradually increased, and the total output powers other than the total output power $P_{o1}$ and $P_{o5}$ are kept zero. The rest may be deduced by analog.

Please refer to FIG. 10B. After the input powers are processed by the power conversion system 1, the curves corresponding to the eight input powers are shown in FIG. 10B. When the load-added number is in the range between 0 and 2, the curves corresponding to the eight input powers are nearly overlapped. That is, the input powers are nearly consistent. When the load-added number is in the range between 2 and 4, only some of the curves corresponding to the eight input powers are overlapped. Similarly, when the load-added number is in the range between 4 and 8, only some of the curves corresponding to the eight input powers are overlapped. However, when compared with the output powers as shown in FIG. 10A, the consistence of the input powers is better. Since the loads are connected to the power conversion system 1 according to the load-adding sequence, the input powers of the N power converters 3 are nearly identical or closer to each other.

Figure 11A:
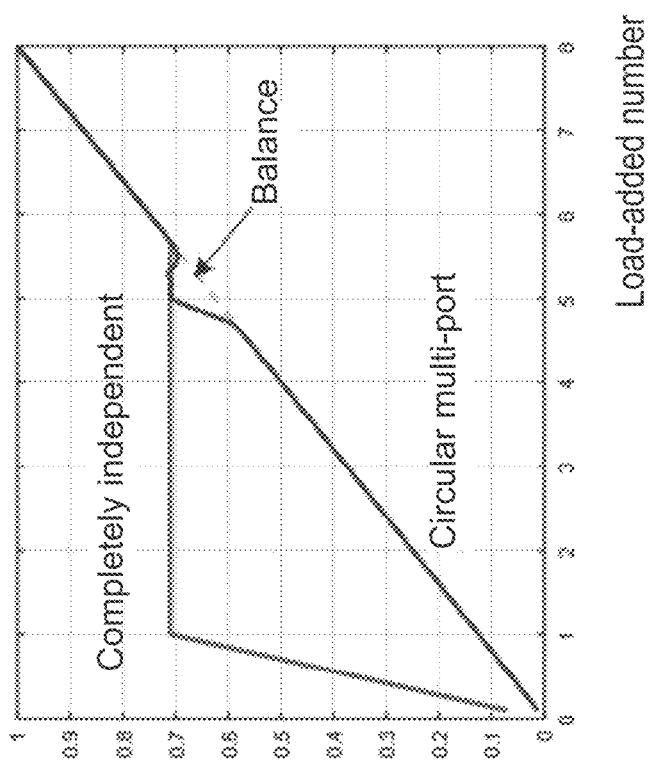
FIG. 11A is a plot illustrating the changes of the AC total currents for the conventional power conversion system and the power conversion system of FIG. 1 according to the load-adding sequence of FIG. 9.
Figure 11B:
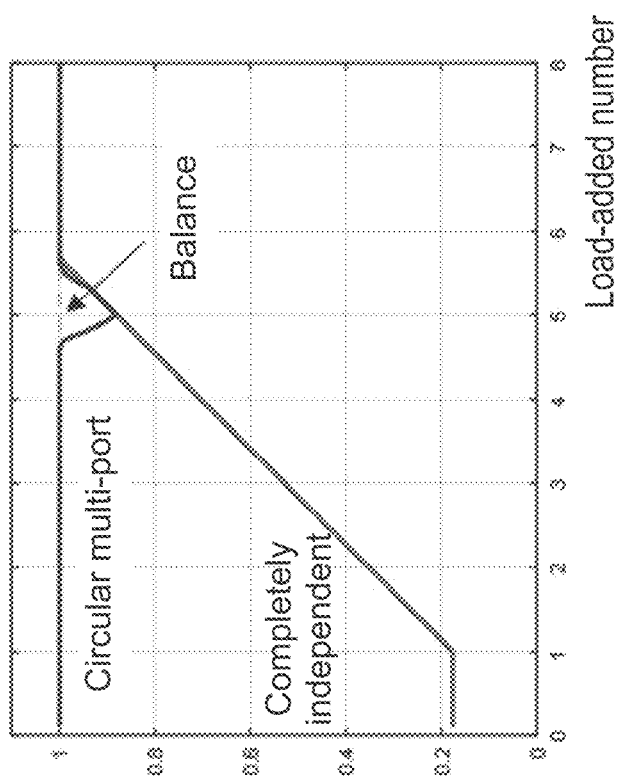
FIG. 11B is a plot illustrating the changes of the power factors for the conventional power conversion system and the power conversion system of FIG. 1 according to the load-adding sequence of FIG. 9.
Figure 11C:
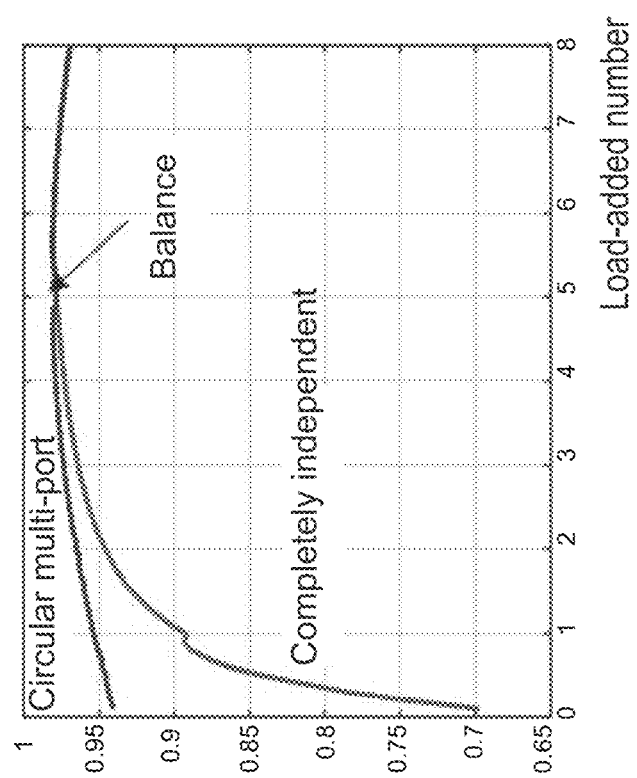
FIG. 11C is a plot illustrating the changes of the efficiencies for the rectifier units of the conventional power conversion system and the power conversion system of FIG. 1 according to the load-adding sequence of FIG. 9.

Please refer to FIGS. 11A, 11B and 11C. FIG. 11A is a plot illustrating the changes of the AC total currents for the conventional power conversion system and the power conversion system of FIG. 1 according to the load-adding sequence of FIG. 9. FIG. 11B is a plot illustrating the changes of the power factors for the conventional power conversion system and the power conversion system of FIG. 1 according to the load-adding sequence of FIG. 9. FIG. 11C is a plot illustrating the changes of the efficiencies for the rectifier units of the conventional power conversion system and the power conversion system of FIG. 1 according to the load-adding sequence of FIG. 9. As mentioned above, the plurality of power converters of the second conventional power conversion system output the powers independently. In contrast, the power conversion system 1 of the present disclosure is a multi-port power conversion system, and the N power converters 3 of the power conversion system 1 are connected with each other in a circular arrangement. When compared with the conventional power conversion system, the power conversion system 1 of the present disclosure is more advantageous. For example, it is easier to balance the AC total current, and the power factor is increased. Moreover, the efficiency of the rectifier unit of the power conversion system 1 is better. In other words, the magnitude of the reactive current to achieve balance of the power conversion system 1 is lower.

Figure 12:
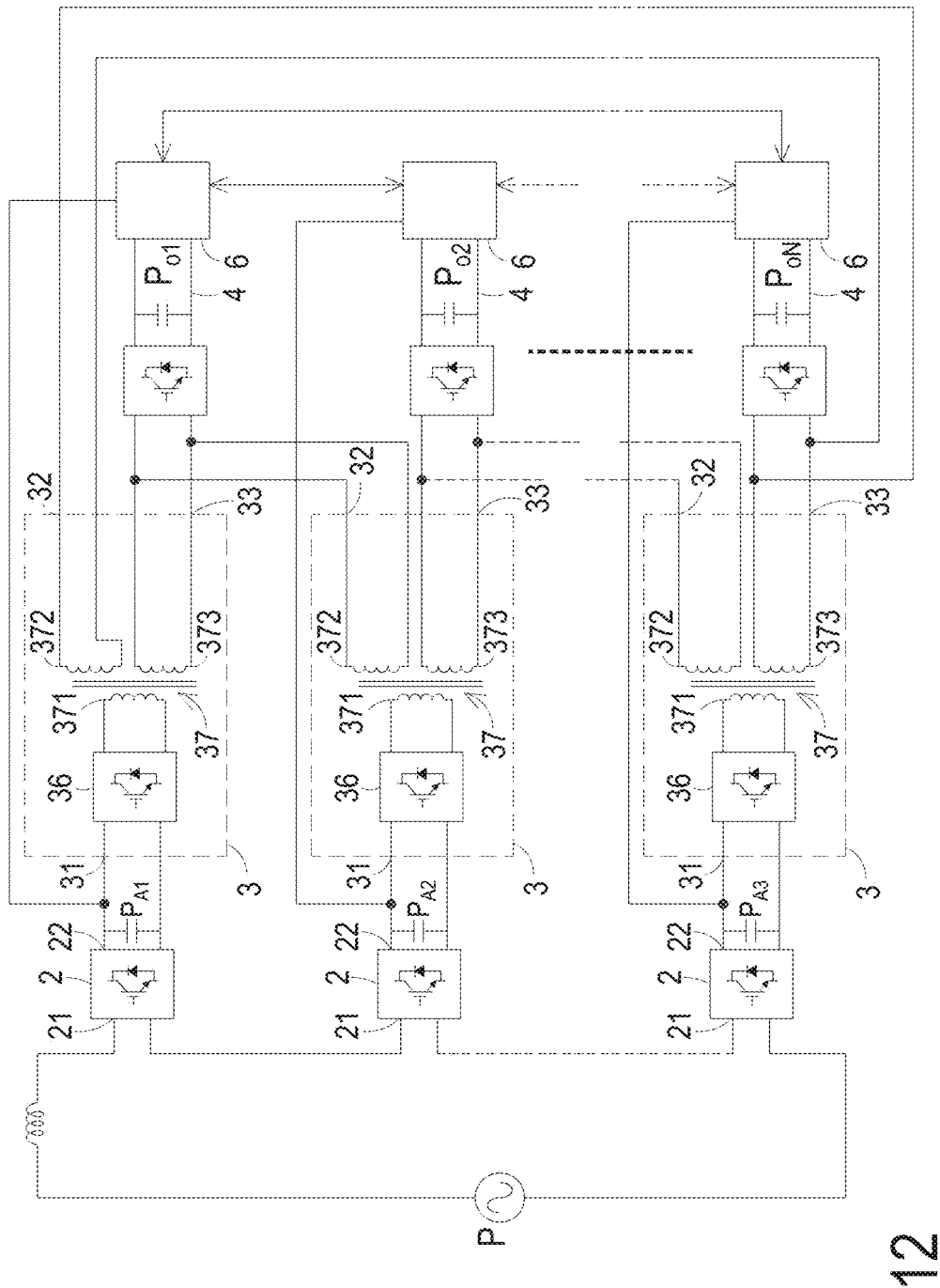
FIG. 12 is a schematic circuit block diagram illustrating a power conversion system according to a third embodiment of the present disclosure.

FIG. 12 is a schematic circuit block diagram illustrating a power conversion system according to a third embodiment of the present disclosure. In comparison with the power conversion system 1a of the second embodiment as shown in FIG. 5, the circuitry structure of each power converter 3 in the power conversion system 1b of this embodiment is distinguished. The power converter 3 includes an inverter 36 and a transformer 37. A first terminal of the inverter 36 is connected with the input terminal 31 of the power converter 3. The transformer 37 includes a primary winding 371, a first secondary winding 372 and a second secondary winding 373. The primary winding 371 is magnetically coupled with the first secondary winding 372 and the second secondary winding 373. The primary winding 371 is connected with a second terminal of the inverter 36. The first secondary winding 372 is connected with the first output terminal 32 of the power converter 3. The second secondary winding 373 is connected with the second output terminal 33 of the power converter 3. Optionally, an isolated circuit such as a dual active bridge (DAB) circuit or a resonant circuit (LLC) is used for each power converter 3 of the power conversion system 1b.

Moreover, the transformers 37 of the power converters 3 in the power conversion system 1b are connected with each other according to a specified connecting relationship. For example, the second secondary winding 373 of the transformer 37 of the i-th power converter 3 is connected with the first secondary winding 372 of the transformer 37 of the (i+1)-th power converter 3, and the second secondary winding 373 of the transformer 37 of the N-th power converter 3 is connected with the first secondary winding 372 of the transformer 37 of the first power converter 3. Consequently, the transformers 37 of the N power converters 3 need to be operated at the same switching frequency.

Figure 13:
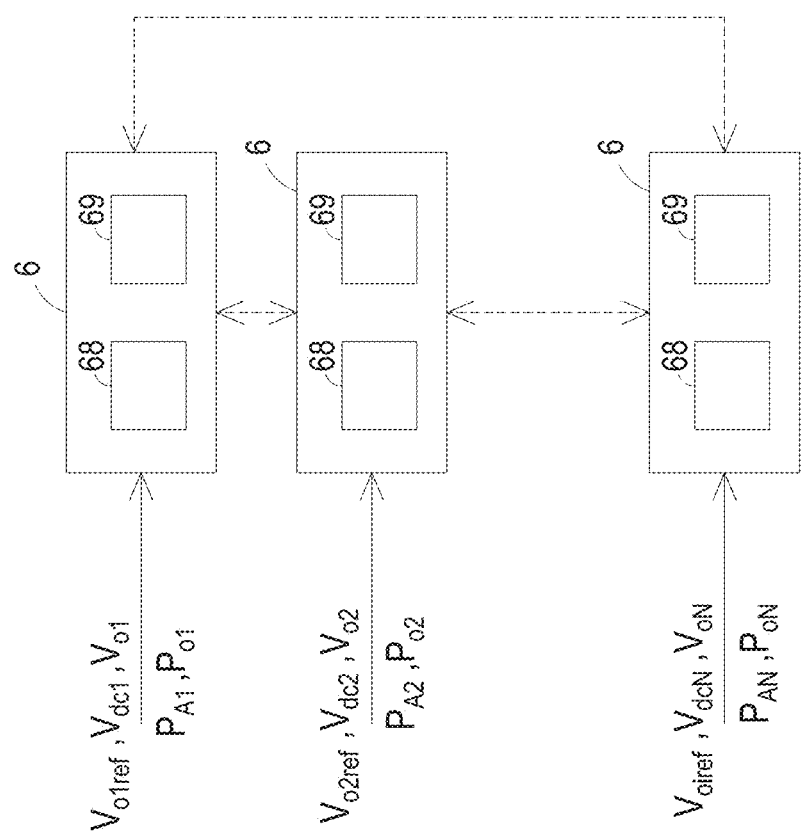
FIG. 13 schematically illustrates the relationships between associated powers, voltages and the port controllers of the power conversion system as shown in FIG. 12.

Please refer to FIGS. 12 and 13. FIG. 13 schematically illustrates the relationships between associated powers, voltages and the port controllers of the power conversion system as shown in FIG. 12. The N port controllers 6 are electrically connected with the total output terminals 4 of the corresponding power converters 3. Each port controller 6 includes an input side controller 68 and an output side controller 69. The input side controller 68 can control the phase shift angle of the primary voltage signal of the transformer 37. Consequently, the input power of the input terminal 31 of each power converter 3 can be regulated to be consistent. The output side controller 69 controls the phase shift angle of the secondary voltage signal of the transformer 37 in order to adjust the output voltage of the total output terminal 4.

A method of acquiring the phase shift angle of the voltage at the primary winding 371 of the transformer 37 and the phase shift angle of the voltage at the second secondary winding 373 of the transformer 37 will be described as follows.

The i-th port controller 6 is connected with the i-th total output terminal 4 and the input terminal 31 of the i-th power converter 3. In addition, the i-th port controller 6 receives the i-th output voltage $V_{oi}$, the i-th output power $P_{oi}$ and the reference voltage value $V_{oiref}$ from the i-th total output terminal 4, and the i-th port controller 6 receives the i-th input terminal voltage $V_{dci}$ and the input power $P_{Ai}$ from the input terminal 31 of the i-th power converter 3. In this embodiment, the N port controllers 6 are in communication with each other to acquire the input power $P_{Ai}$ from all port controllers 6 through communication coordination. Moreover, each port controller 6 acquires the input power average value $\overline{P}$ of the N port controllers 6 through calculations. Similarly, the N port controllers 6 acquires the input terminal voltages $V_{dci}$ from all port controllers 6 through communication coordination. Moreover, each port controller 6 acquires the input terminal voltage average value $\overline{V_{dc}}$ of the N port controllers 6 through calculations. Similarly, the N port controllers 6 acquires the output voltages $V_{oi}$ from all port controllers 6 through communication coordination. Moreover, each port controller 6 acquires the output voltage average value $\overline{V_o}$ of the N port controllers 6 through calculations.

Figure 14B:
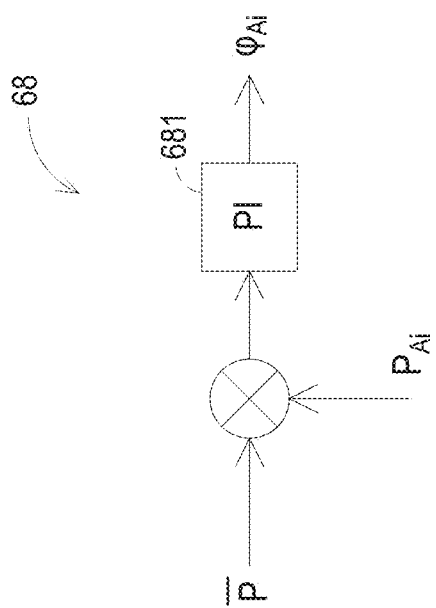
FIG. 14B is a schematic circuit block diagram illustrating another exemplary circuitry structure of the input side controller in the port controller as shown in FIG. 13.
Figure 14A:
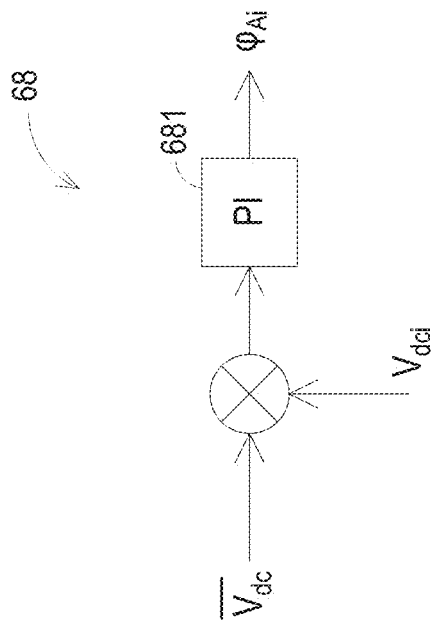
FIG. 14A is a schematic circuit block diagram illustrating an exemplary circuitry structure of the input side controller in the port controller as shown in FIG. 13.

Please refer to FIGS. 12, 13 and 14A. FIG. 14A is a schematic circuit block diagram illustrating an exemplary circuitry structure of the input side controller in the port controller as shown in FIG. 13. The input side controller 68 includes a subtractor and a proportional integral (PI) controller 681. After the input power $P_{Ai}$ is subtracted from the input power average value $\overline{P}$ by the subtractor, a difference value is obtained. Then, the different value is processed by the PI controller 681, the phase shift angle $\varphi_{Ai}$ of the voltage at the primary winding 371 of the transformer 37 in the corresponding power converter 3 is obtained. The phase shift angle $\varphi_{Ai}$ may be expressed by the following formulae:

$\varphi_{A1}=-PI(\overline{P}-P_{A1})$, and $\varphi_{Ai}=-PI(\overline{P}-P_{Ai})$ In the above formulae, $\varphi_{A1}$ is the phase shift angle of the voltage at the primary winding 371 of the transformer 37 of the first power converter 3, $\varphi_{Ai}$ is the phase shift angle of the voltage at the primary winding 371 of the transformer 37 of the i-th power converter 3, PI is a proportional integral function according to the circuit characteristics of the power conversion system 1b, $\overline{P}$ is the average value of the input powers of the N power converters 3, $P_{A1}$ is an input power of the input terminal 31 of the first power converter 3, and $P_{Ai}$ is an input power of the input terminal 31 of the i-th power converter 3.

In another embodiment, the input side controller 68 acquires the phase shift angle $\varphi_{Ai}$ of the voltage at the primary winding 371 of the transformer 37 according to the input terminal voltages. FIG. 14B is a schematic circuit block diagram illustrating another exemplary circuitry structure of the input side controller in the port controller as shown in FIG. 13. The input side controller 68 includes a subtractor and a proportional integral (PI) controller 681. After the input terminal voltage $V_{dci}$ is subtracted from the input terminal voltage average value $\overline{V_{dc}}$ by the subtractor, a difference value is obtained. Then, the different value is processed by the PI controller 681, the phase shift angle $\varphi_{Ai}$ of the voltage at the primary winding 371 of the transformer 37 in the corresponding power converter 3 is obtained. The phase shift angle $\varphi_{Ai}$ may be expressed by the following formula:

$\varphi_{A1}=PI(\overline{V_{dc}}-V_{dc1})$, and $\varphi_{Ai}=PI(\overline{V_{dc}}-V_{dci})$ In the above formulae, $\varphi_{A1}$ is the phase shift angle of the voltage at the primary winding 371 of the transformer 37 of the first power converter 3, $\varphi_{Ai}$ is the phase shift angle of the voltage at the primary winding 371 of the transformer 37 of the i-th power converter 3, PI is a proportional integral function according to the circuit characteristics of the power conversion system 1b, $\overline{V_{dc}}$ is the average value of the voltages of the input terminals of the N power converters 3, $V_{dci1}$ is a voltage of the input terminal 31 of the first power converter 3, and $V_{dci}$ is a voltage of the input terminal 31 of the i-th power converter 3.

Figure 15:
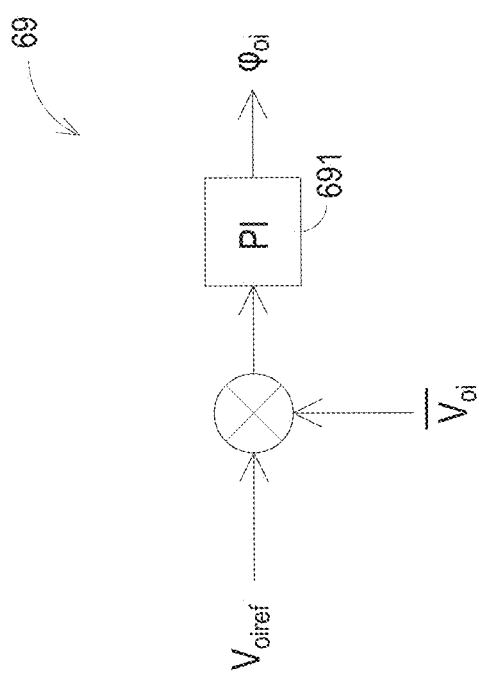
FIG. 15 is a schematic circuit block diagram illustrating a circuitry structure of the output side controller in the port controller as shown in FIG. 13.

Please refer to FIGS. 12, 13 and 15. FIG. 15 is a schematic circuit block diagram illustrating a circuitry structure of the output side controller in the port controller as shown in FIG. 13. The output side controller 69 includes a subtractor and a proportional integral (PI) controller 691. After the i-th output voltage $V_{oi}$ is subtracted from the reference voltage value $V_{oiref}$ by the subtractor, a difference value is obtained. Then, the different value is processed by the PI controller 691, the phase shift angle $\varphi_{oi}$ of the voltage at the second secondary winding 373 of the transformer 37 in the corresponding power converter 3 is obtained. The phase shift angle $\varphi_{oi}$ may be expressed by the following formulae:

$\varphi_{o1}=PI(V_{o1ref}-V_{o1})$, and $\varphi_{oi}=PI(V_{oiref}-V_{oi})$

In the above formulae, $\varphi_{o1}$ is the phase shift angle of the voltage at the second secondary winding 373 of the transformer 37 of the first power converter 3, $\varphi_{oi}$ is the phase shift angle of the voltage at the second secondary winding 373 of the transformer 37 of the i-th power converter 3, PI is a proportional integral function according to the circuit characteristics of the power conversion system 1b, $V_{o1ref}$ is the reference voltage value of the total output terminal 4 of the first power converter 3, $V_{oiref}$ is the reference voltage value of the total output terminal 4 of the i-th power converter 3, $V_{o1}$ is the voltage of the total output terminal 4 of the first power converter 3, and $V_{oi}$ is the voltage of the total output terminal 4 of the i-th power converter 3.

After the input side controller 68 and the output side controller 69 of the port controller 6 calculate the phase shift angles $\varphi_{Ai}$ and $\varphi_{oi}$, the voltages of the input terminal 31 and the total output terminal 4 of the corresponding power converter 3 are respectively controlled.

Figure 16:
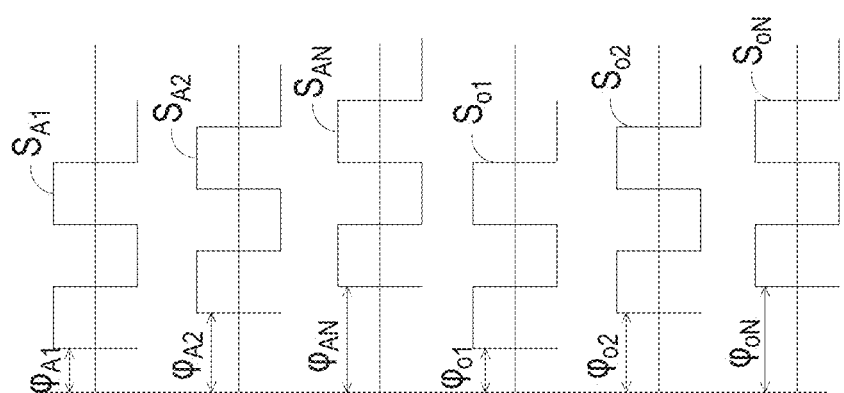
FIG. 16 is a schematic timing waveform diagram illustrating associated voltages at the input terminals and the total output terminals of the corresponding power converters in the power conversion system as shown in FIG. 12.

Please refer to FIGS. 12, 13, 14, 15 and 16. FIG. 16 is a schematic timing waveform diagram illustrating associated voltages at the input terminals and the total output terminals of the corresponding power converters in the power conversion system as shown in FIG. 12. The waveform $S_{A1}$ denotes the voltage at the primary winding 371 of the transformer 37 of the first power converter 3. The waveform $S_{A2}$ denotes the voltage at the primary winding 371 of the transformer 37 of the second power converter 3. The waveform $S_{AN}$ denotes the voltage at the primary winding 371 of the transformer 37 of the N-th power converter 3. It is noted that the waveforms of the voltages at the primary windings 371 of the transformers 37 of the other power converters are similar. Moreover, the voltage $S_{A1}$ has a phase shift angle $\varphi_{A1}$, the voltage $S_{A2}$ has a phase shift angle $\varphi_{A2}$, and the voltage $S_{AN}$ has a phase shift angle $\varphi_{AN}$. After the input powers of the input terminals 31 of the N power converters 3 are controlled according to the corresponding phase shift angles, these input powers are regulated to be consistent.

Please refer to FIG. 16 again. The waveform $S_{o1}$ denotes the voltage at the second secondary winding 373 of the transformer 37 of the first power converter 3. The waveform $S_{o2}$ denotes the voltage at the second secondary winding 373 of the transformer 37 of the second power converter 3. The waveform $S_{oN}$ denotes the voltage at the second secondary winding 373 of the transformer 37 of the N-th power converter 3. It is noted that the waveforms of the voltages at the second secondary winding 373 of the transformers 37 of the other power converters are similar. Moreover, the voltage $S_{o1}$ has a phase shift angle $\varphi_{o1}$, the voltage $S_{o2}$ has a phase shift angle $\varphi_{o2}$, and the voltage $S_{oN}$ has a phase shift angle $\varphi_{oN}$. The output powers from the total output powers 4 of the corresponding power converters 3 are controlled according to the phase shift angles.

Figure 17A:
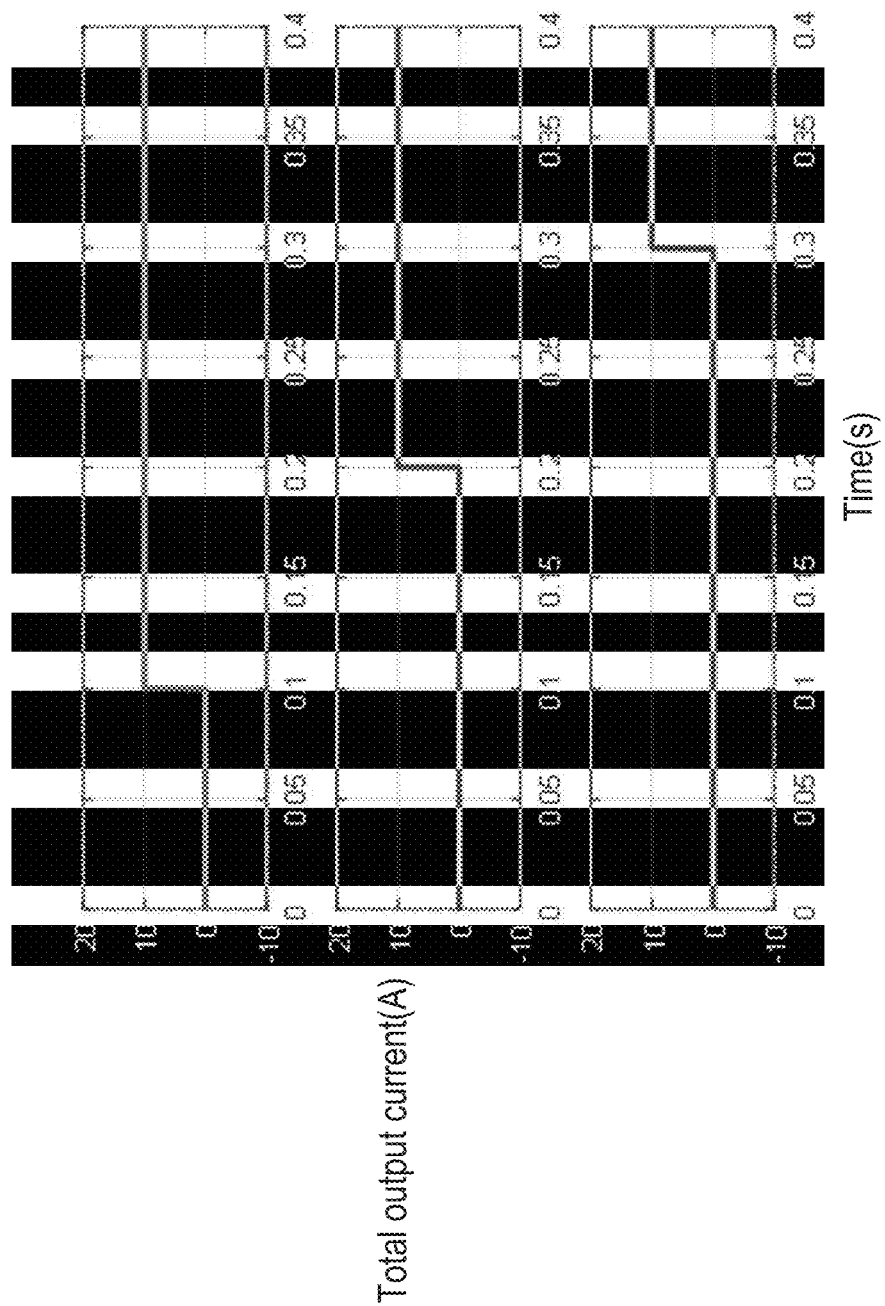
FIG. 17A is a schematic timing waveform diagram illustrating associated currents flowing through the total output terminals of the corresponding power converters in the power conversion system as shown in FIG. 12.

FIG. 17A is a schematic timing waveform diagram illustrating associated currents flowing through the total output terminals of the corresponding power converters in the power conversion system as shown in FIG. 12. In an embodiment, the turn ratios of the transformers 37 of the N power converters 3 are identical, for example the turn ratios of the transformers 37 of the N power converters 3 are 1:1: . . . :1. The capacitance of each output capacitor at the total output terminal 4 of each power converter 3 is 1 mF. In FIG. 17A, the first waveform denotes the current flowing through the first total output terminal 4, the second waveform denotes the current flowing through the second total output terminal 4, and the third waveform denotes the current flowing through the N-th total output terminal 4. As shown in FIG. 17A, the currents flowing through the total output terminals 4 are inconsistent. Under this circumstance, the power conversion system 1b can be controlled according to the phase shift angles.

Figure 17B:
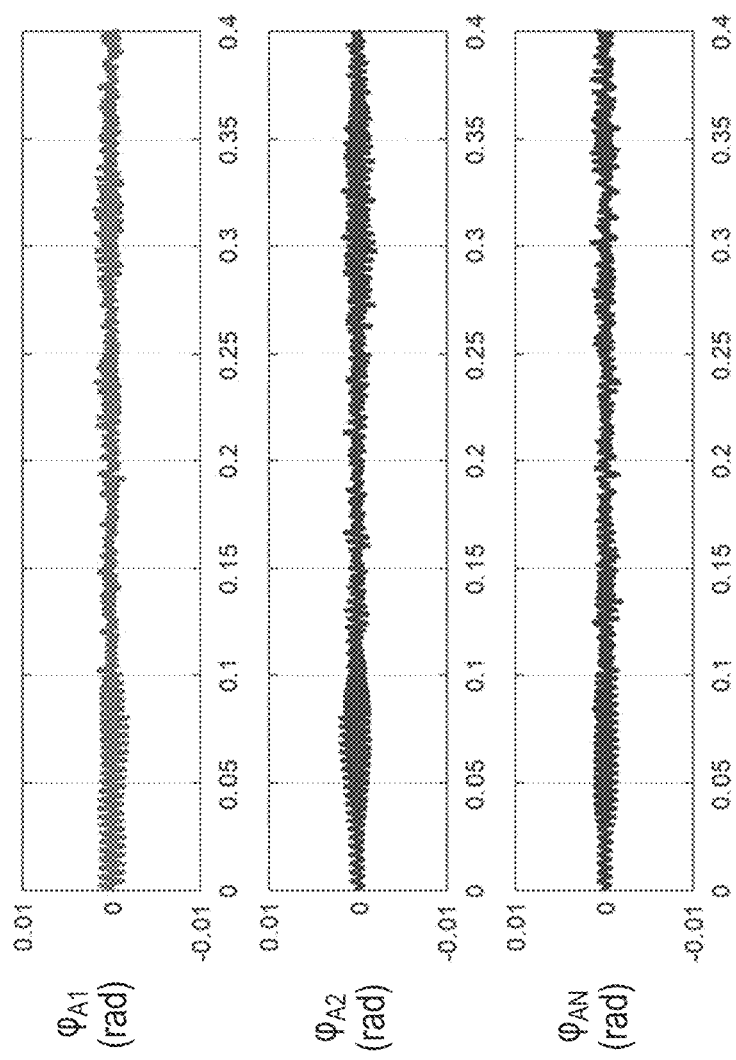
FIG. 17B is a schematic timing waveform diagram illustrating associated phase shift angles of the voltages at the primary windings of the transformers of the corresponding power converters in the power conversion system as shown in FIG. 12.
Figure 17C:
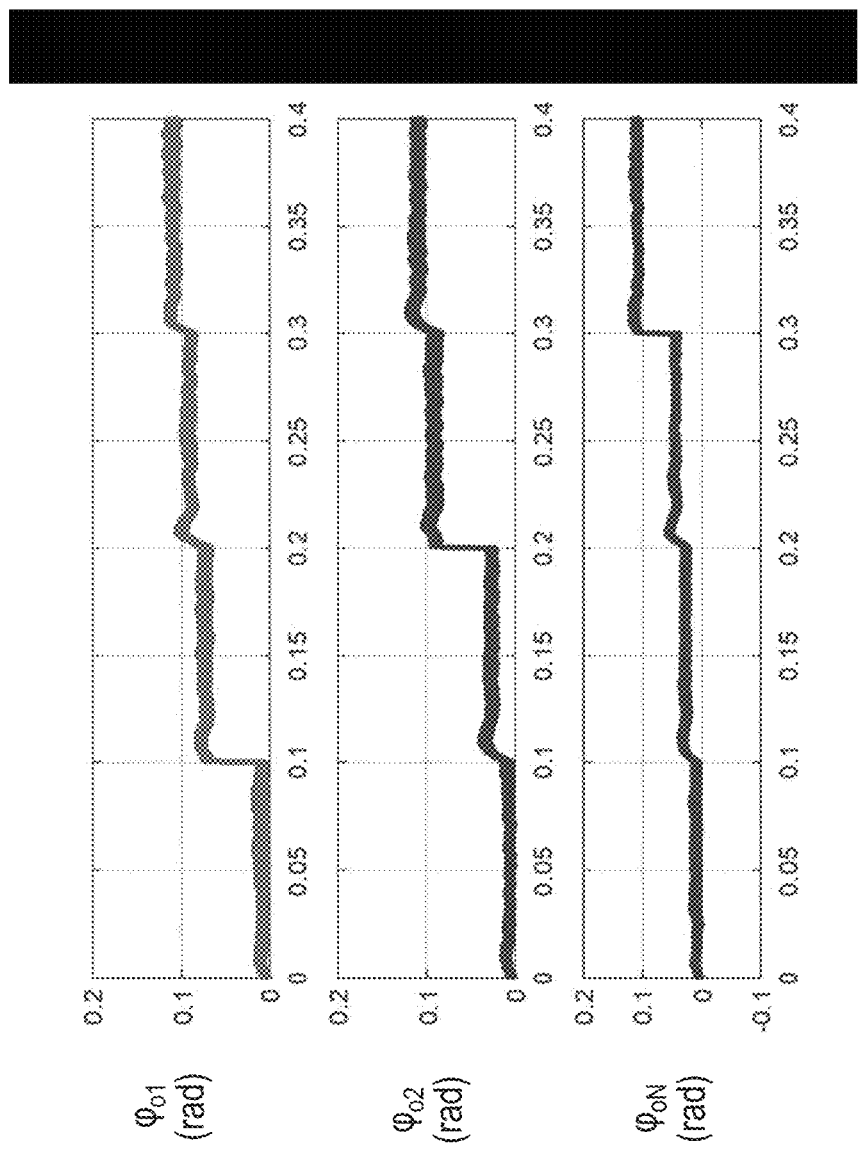
FIG. 17C is a schematic timing waveform diagram illustrating associated phase shift angles of the voltages at the second secondary windings of the transformers of the corresponding power converters in the power conversion system as shown in FIG. 12.

FIG. 17B is a schematic timing waveform diagram illustrating associated phase shift angles of the voltages at the primary windings of the transformers of the corresponding power converters in the power conversion system as shown in FIG. 12. FIG. 17C is a schematic timing waveform diagram illustrating associated phase shift angles of the voltages at the second secondary windings of the transformers of the corresponding power converters in the power conversion system as shown in FIG. 12. According to the phase shift angles $\varphi_{Ai}$ and $\varphi_{oi}$, the input voltages of the input terminals 31 of the power converters 3 are regulated to be consistent and the output voltages at the total output terminals 4 are regulated to be more stable.

Figure 17D:
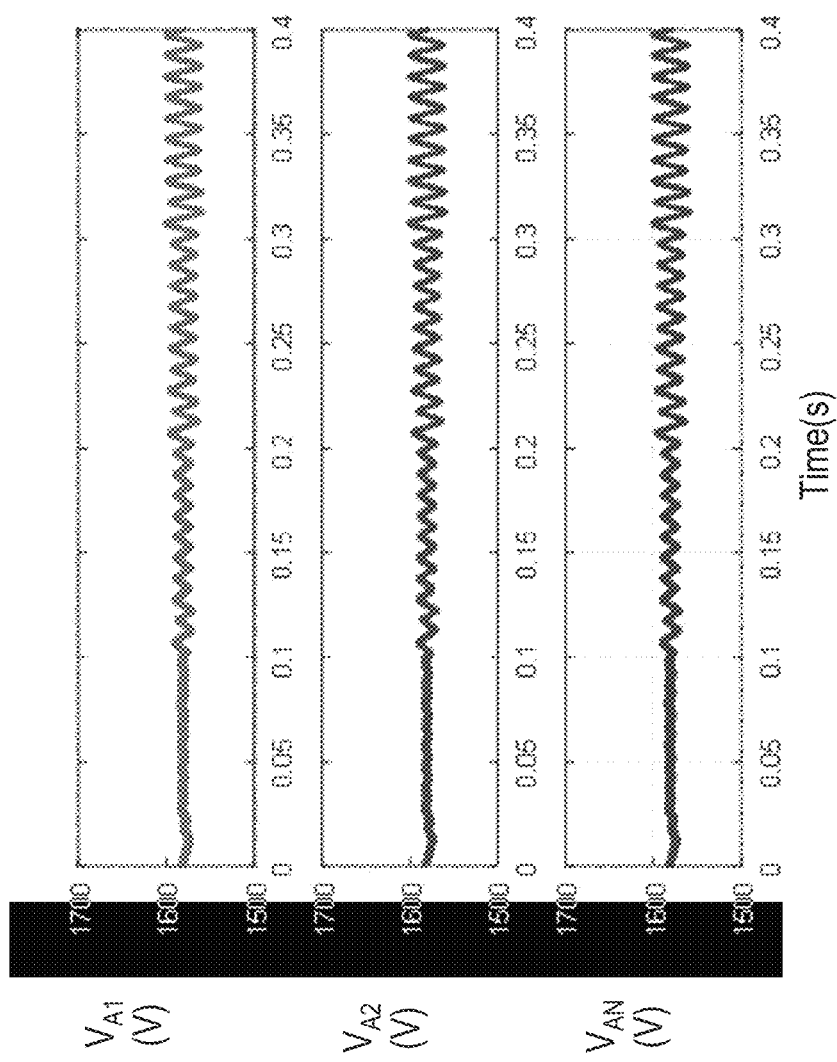
FIG. 17D is a schematic timing waveform diagram illustrating associated voltages at the input terminals of the corresponding power converters in the power conversion system as shown in FIG. 12.

FIG. 17D is a schematic timing waveform diagram illustrating associated voltages at the input terminals of the corresponding power converters in the power conversion system as shown in FIG. 12. In FIG. 17D, the first waveform denotes the input voltage $V_{A1}$ at the input terminal 31 of the first power converter 3, the second waveform denotes the input voltage $V_{A2}$ at the input terminal 31 of the second power converter 3, and the third waveform denotes the input voltage VAN at the input terminal 31 of the N-th power converter 3. As shown in FIG. 17D, the input voltages at the input terminals 31 of the N power converters 3 are regulated to be nearly consistent (e.g., about 1580V).

Figure 17E:
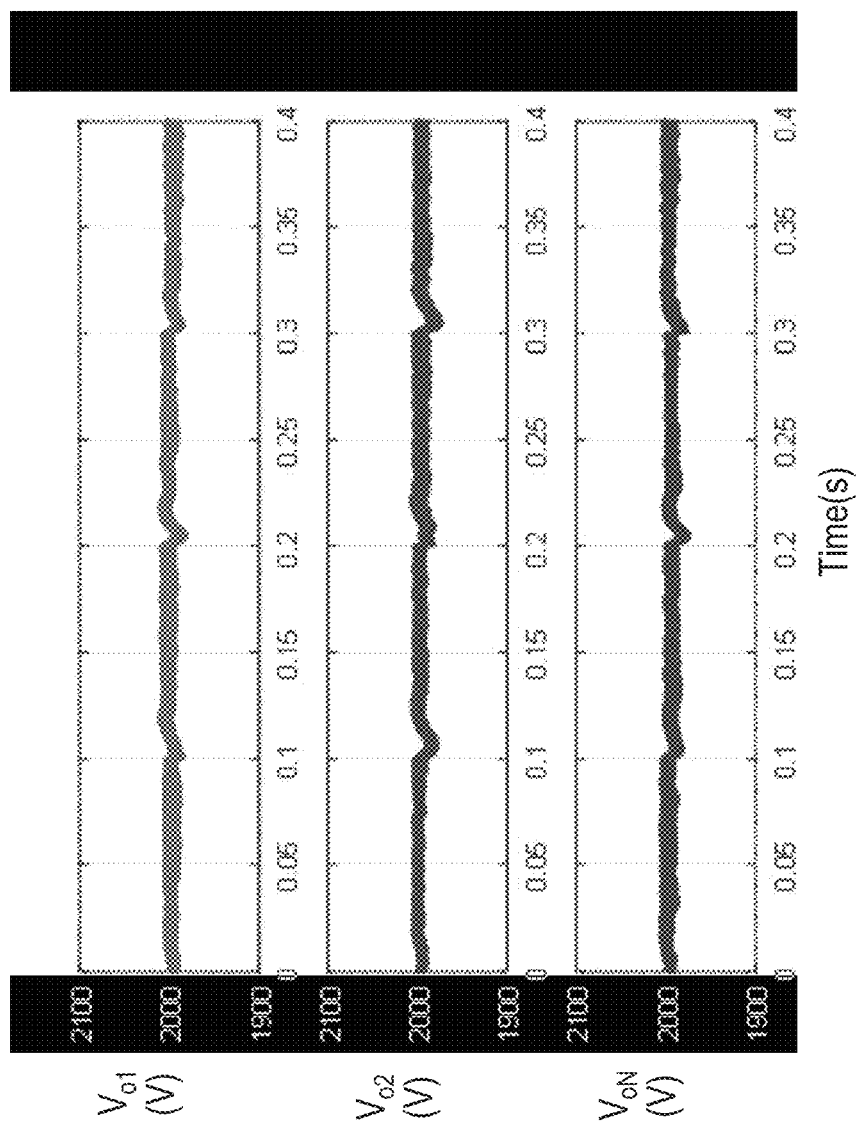
FIG. 17E is a schematic timing waveform diagram illustrating associated voltages at the total output terminals of the corresponding power converters in the power conversion system as shown in FIG. 12.

FIG. 17E is a schematic timing waveform diagram illustrating associated voltages at the total output terminals of the corresponding power converters in the power conversion system as shown in FIG. 12. In FIG. 17E, the first waveform denotes the output voltage $V_{o1}$ at the total output terminal 4 of the first power converter 3, the second waveform denotes the output voltage $V_{o2}$ at the total output terminal 4 of the second power converter 3, and the third waveform denotes the output voltage $V_{oN}$ at the total output terminal 4 of the N-th power converter 3. As shown in FIG. 17E, the output voltages from the total output terminals 4 of the N power converters 3 are regulated to be stable (e.g., about 2000V).

Figure 17F:
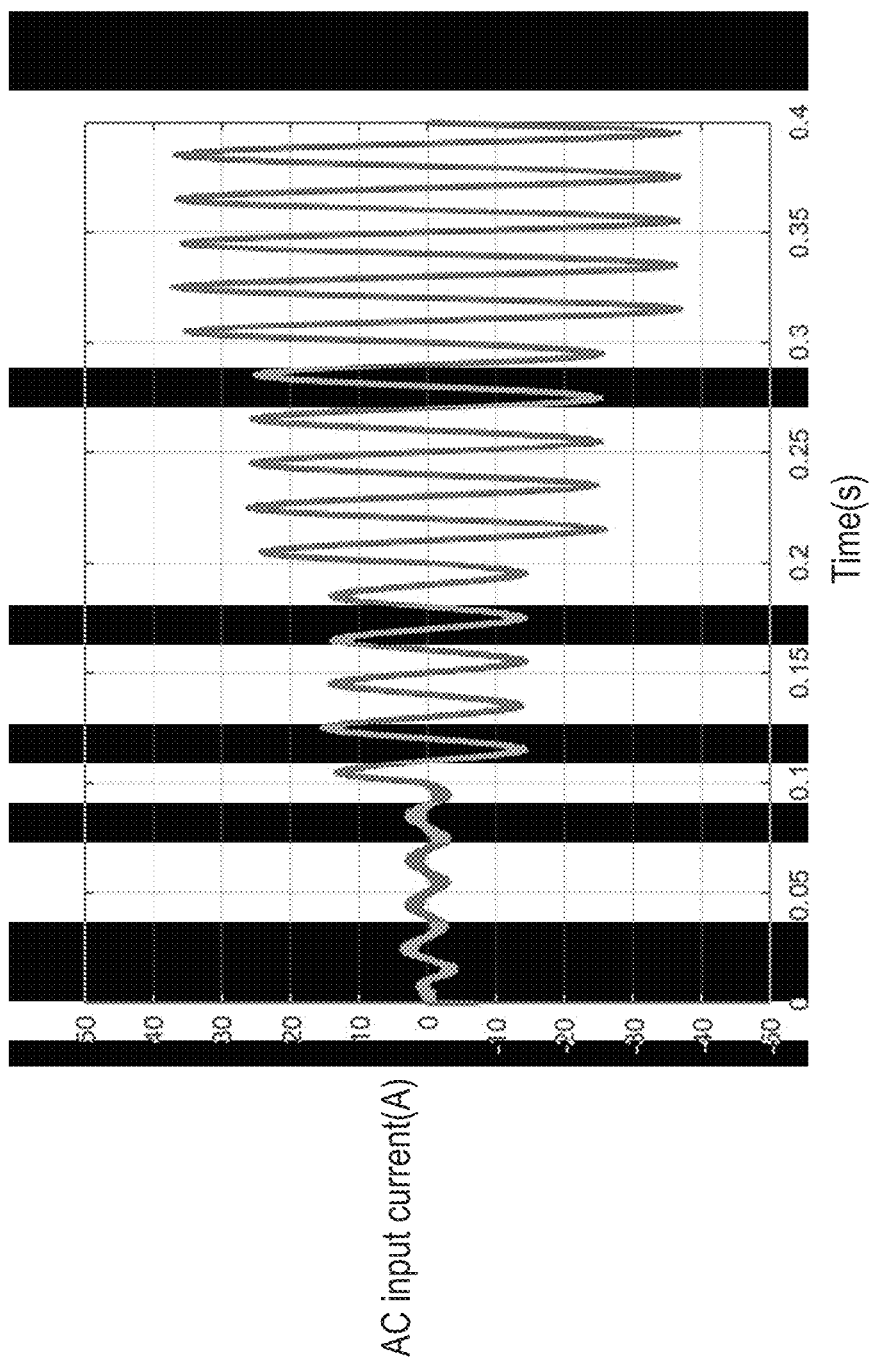
FIG. 17F is a schematic timing waveform diagram illustrating the AC input current of the power conversion system as shown in FIG. 12.

FIG. 17F is a schematic timing waveform diagram illustrating the AC input current of the power conversion system as shown in FIG. 12. The input voltages at the input terminals 31 of the N power converters 3 are regulated to be nearly consistent and the waveform of the AC input current is satisfactory.

Figure 18:
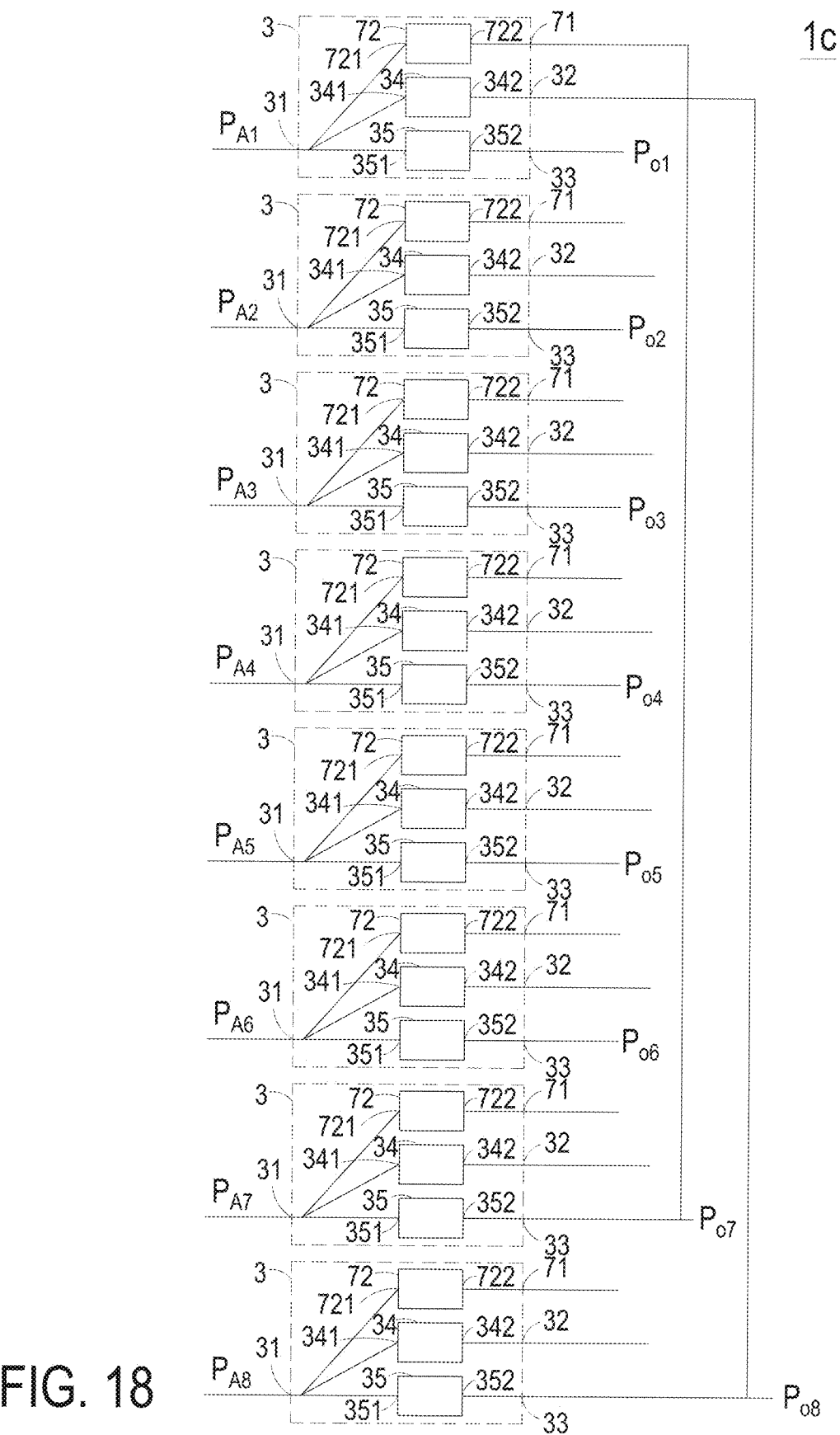
FIG. 18 schematically illustrates the power distribution of the power converters of a power conversion system according to a third embodiment of the present disclosure.

It is noted that numerous modifications and alterations may be made while retaining the teachings of the disclosure. For example, the power converter may include three or more than three DC/DC conversion circuits. FIG. 18 schematically illustrates the power distribution of the power converters of a power conversion system according to a third embodiment of the present disclosure. In this embodiment, the power conversion system 1c includes eight power converters 3, and each power converter 3 includes three DC/DC conversion circuits. Moreover, each power converter 3 includes an input terminal 31, a first output terminal 32, a second output terminal 33 and a third output terminal 71.

The first output terminal 32 of the first power converter 3, the second output terminal 33 of the N-th power converter 3 and the third output terminal 71 of the second power converter 3 are connected to the N-th total output terminal 4. The N-th total output terminal 4 outputs the N-th total output power $P_{oN}$. For example, the N-th power converter 3 is the eighth power converter 3, and the eighth total output terminal 4 outputs the eighth total output power $P_{o8}$. The first output terminal 32 of the i-th power converter 3, the second output terminal 33 of the (i−1)-th power converter 3 and the third output terminal 71 of the (i+1)-th power converter 3 are connected to the (i−1)-th total output terminal 4. The (i−1)-th total output terminal 4 outputs the (i−1)th total output power $P_{o(i-1)}$, wherein i is an integer greater than or equal to 2 and less than 8. For example, if i=2, the first output terminal 32 of the second power converter 3, the second output terminal 33 of the first power converter 3 and the third output terminal 71 of the third power converter 3 are connected to the first total output terminal 4. The first total output terminal 4 outputs the first total output power $P_{o1}$.

In this embodiment, each power converter 3 of the power conversion system 1c includes a first DC/DC conversion circuit 34, a second DC/DC conversion circuit 35 and a third DC/DC conversion circuit 72. The third DC/DC conversion circuit 72 has an input terminal 721 and an output terminal 722. The input terminal 341 of the first DC/DC conversion circuit 34, the input terminal 351 of the second DC/DC conversion circuit 35 and the input terminal 721 of the third DC/DC conversion circuit 72 are connected to the input terminal 31 of the corresponding power converter 3. The output terminal 722 of the third DC/DC conversion circuit 72 is connected to the third output terminal 71 of the corresponding power converter 3. The circuitry structure of the power conversion system 1c of this embodiment can increase the output power of the total output terminal 4. Consequently, the reliability of the power conversion system 1c is enhanced. The load-adding method of the power conversion system 1c is similar to that of FIG. 9, and not redundantly described herein. It is noted that the number of the output terminals of each power converter of the power conversion system is not limited to two as shown in the first embodiment and three as shown in the third embodiment and can be varied according to the practical requirements.

Figure 19:
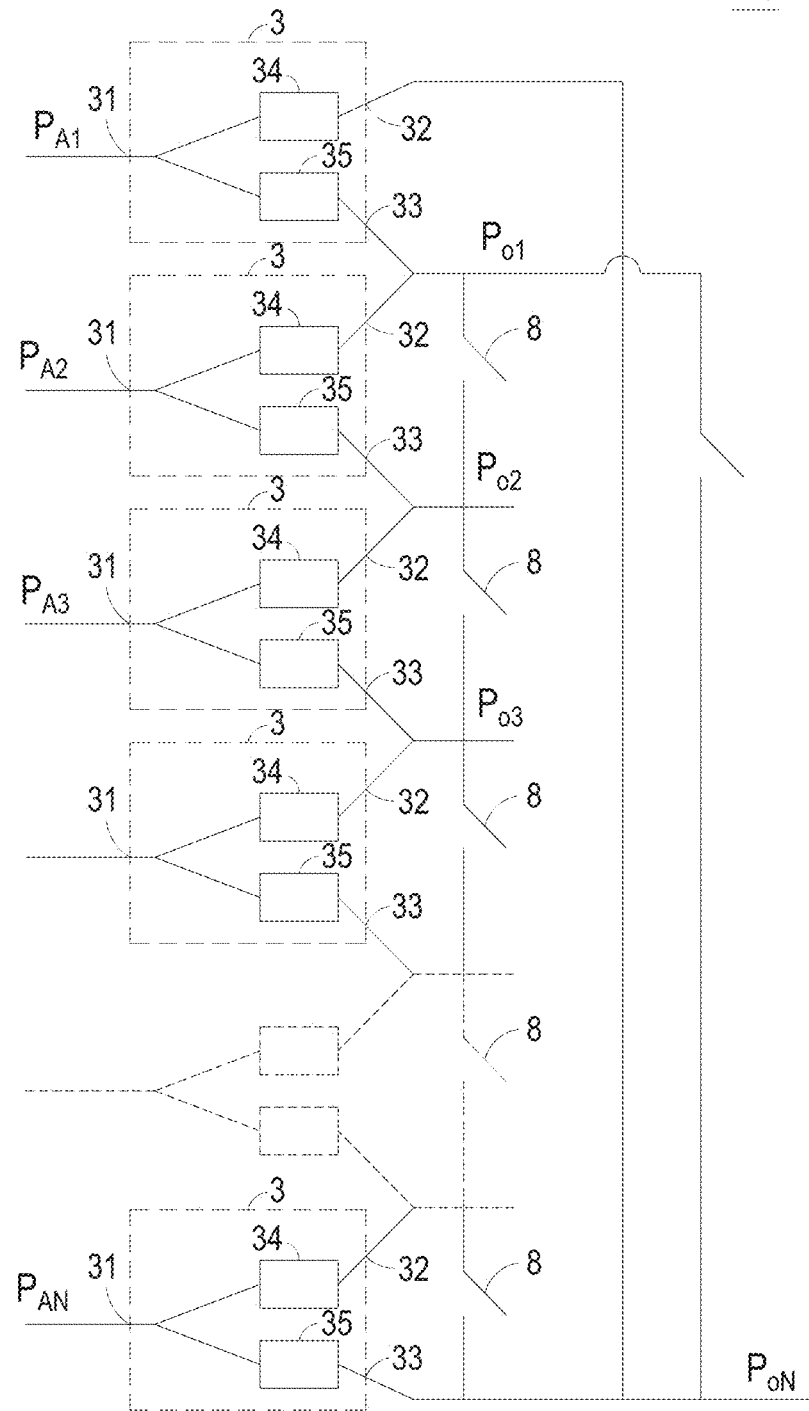
FIG. 19 is a schematic circuit block diagram illustrating a power conversion system according to a fourth embodiment of the present disclosure.

FIG. 19 is a schematic circuit block diagram illustrating a power conversion system according to a fourth embodiment of the present disclosure. In comparison with the power conversion system 1 of the first embodiment, the power conversion system 1e of this embodiment further includes at least one switch 8, e.g., a plurality of switches 8. Each switch 8 is connected between two total output terminals 4. When the switch 8 is in an on state, the total output power from the two connected total output terminals 4 is increased. In this embodiment, each switch 8 is connected between two adjacent total output terminals 4. For example, a switch 8 is connected between the first total output terminal 4 and the second total output terminal 4, and another switch 8 is connected between the (N−1)-th total output terminal 4 and the N-th second total output terminal 4.

Figure 20:
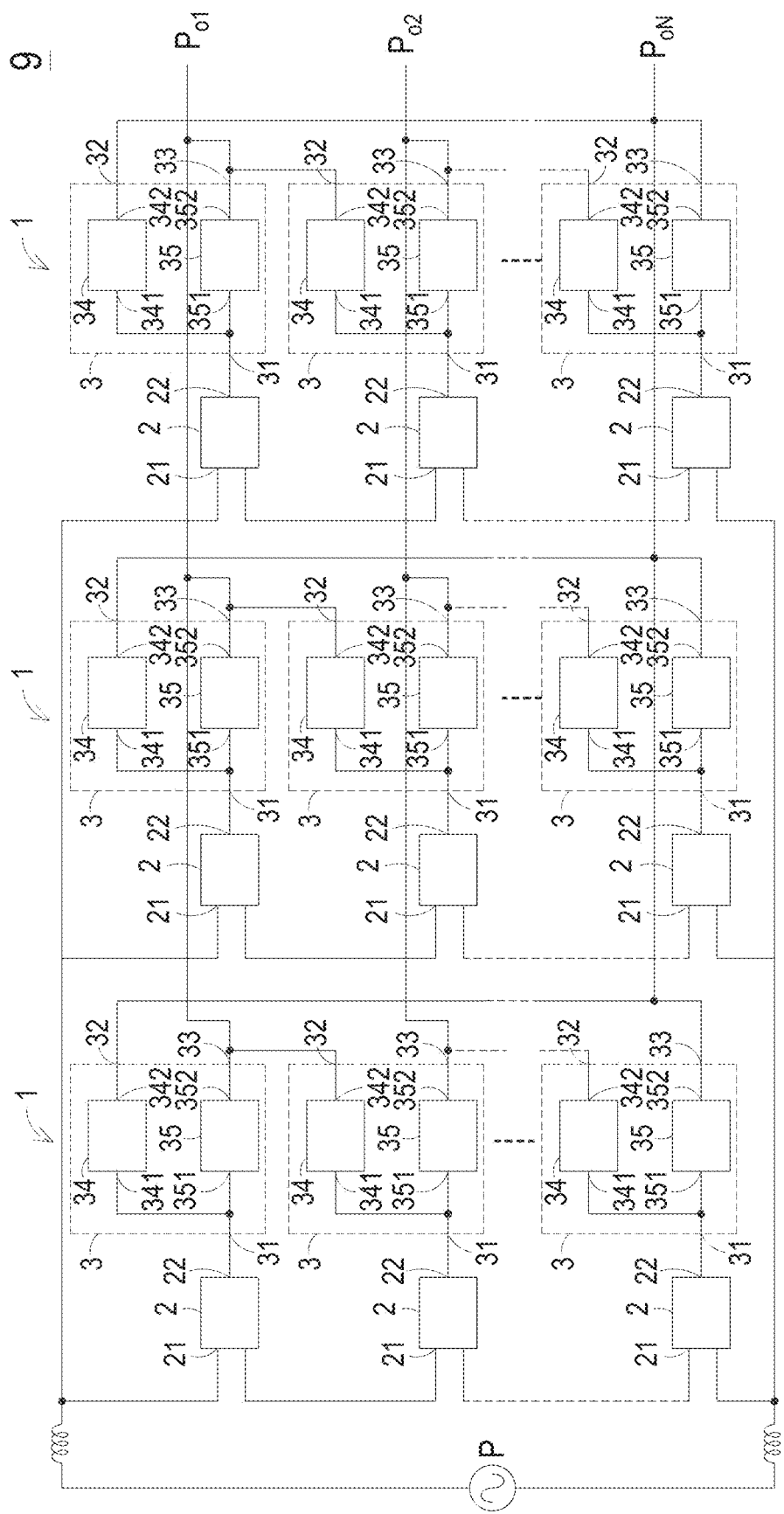
FIG. 20 is a schematic circuit block diagram illustrating a combined power system comprising a three-phase circuitry structure of three power conversion systems.

In the above embodiments, a single power conversion system has a single-phase circuitry structure. In some embodiments, three power conversion systems are connected with each other to form a three-phase circuitry structure. FIG. 20 is a schematic circuit block diagram illustrating a combined power system comprising a three-phase circuitry structure of three power conversion systems. As shown in FIG. 20, the combined power system 9 includes three power conversion systems 1 as shown in FIG. 1. It is noted that the types of the power conversion systems are not restricted.

The input terminals 21 of the rectifier units 2 of the three power conversion systems 1 are connected in series and connected to the AC power source P. The i-th total output terminals 4 of the three power conversion systems 1 are connected with each other in parallel to output the i-th total output power $P_{oi}$. For example, the first total output terminals 4 of the three power conversion systems 1 are connected with each other in parallel to output the first total output power $P_{o1}$, and the N-th total output terminals 4 of the three power conversion systems 1 are connected with each other in parallel to output the N-th total output power $P_{oN}$. In some other embodiments, the i-th total output terminal 4 of the three power conversion systems 1 are connected with each other in series to output the i-th total output power $P_{oi}$. Due to the three-phase circuitry structure, the power balance of the combined power system 9 is enhanced.

From the above descriptions, the present disclosure provides a power conversion system. The power conversion system includes N power converters and N total output terminals to provide output powers to N loads. Consequently, the power conversion system can meet the multi-port requirements. Moreover, the power conversion system is cost-effective and has high charging efficiency. In the power conversion system, the first output terminal of the first power converter 3 and the second output terminal of the N-th power converter are connected in parallel, and the first output terminal of the i-th power converter and the second output terminal of the (i−1)-th power converter are connected in parallel. Consequently, the N power converters are connected in a circular arrangement. If the required power levels for different total output terminals are different, the input power levels for the input terminals of the power converters may be regulated to be consistent according to the practical requirements. In other words, the power conversion system can meet the power factor requirements. Consequently, the efficiency of the power conversion system is increased, and the power loss is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion system comprising:
N power converters, wherein each of the N power converters comprises an input terminal, a first output terminal and a second output terminal, and receives a DC power through the corresponding input terminal, wherein the first output terminal of a first power converter of the N power converters and the second output terminal of an N-th power converter of the N power converters are connected in parallel to form an N-th total output terminal to output an N-th total output power, and the first output terminal of an i-th power converter of the N power converters and the second output terminal of an (i−1)-th power converter of the N power converters are connected in parallel to form an (i−1)-th total output terminal to output an (i−1)-th total output power, wherein i is an integer greater than or equal to 2 and less than N, and N is an integer.

2. The power conversion system according to claim 1, wherein each power converter comprises a first DC/DC conversion circuit and a second DC/DC conversion circuit, wherein an input terminal of the first DC/DC conversion circuit and an input terminal of the second DC/DC conversion circuit are connected with the input terminal of the corresponding power converter, and the received DC power of each power converter is equal to an input power of the first DC/DC conversion circuit plus an input power of the second DC/DC conversion circuit.

3. The power conversion system according to claim 2, wherein an output power from the first output terminal of the i-th power converter is equal to a half of the (i−1)-th total output power minus an (i−1)-th power error value, and an output power from the second output terminal of the i-th power converter is equal to a half of the i-th total output power plus an i-th power error value, wherein an output power from the first output terminal of the first power converter is equal to a half of the N-th total output power minus an N-th power error value, and an output power from the second output terminal of the first power converter is equal to a half of the first output power plus a first power error value, wherein the i-th total output power is equal to the output power from the first output terminal of the (i+1)-th power converter and the output power from the second output terminal of the i-th power converter.

4. The power conversion system according to claim 3, wherein the power conversion system further comprises a computing control unit, and the computing control unit is electrically connected with the total output terminals of the N power converters to receive N total output powers from the N power converters, wherein the computing control unit acquires the first power error value according to a mathematic formula (1), acquires the second power error value to the N-th power error value according to a mathematic formula (2), and controls the output powers from the first output terminals and the second output terminals of the N power converters according to the first power error value to the N-th power error value, $$x_1 = \frac{1}{N}\sum_{i=1}^{N}(N-i)(0.5(P_{oi} - P_{o(i+1)}) - \overline{P}) \quad (1)$$

$$x_i = x_{i-1} - 0.5(P_{oi} + P_{o(i-1)}), i = 2, \ldots, N \quad (2)$$

wherein $x_1$ is the first power error value, $P_{oi}$ is the i-th total output power, $P_{o(i+1)}$ is the (i+1)-th total output power, $P_{o(i+1)}$ is equal to $P_{o1}$ when i=N, $\overline{P}$ is an average value of the N total output powers, $x_j$ is the i-th power error value, $x_{i-1}$ is the (i−1)-th power error value, and $P_{o(i-1)}$ is the (i−1)-th total output power.

5. The power conversion system according to claim 3, wherein the power conversion system further comprises a computing control unit, and the computing control unit is electrically connected with the total output terminals of the N power converters to receive N total output powers from the N power converters, wherein the computing control unit acquires the first power error value to the N-th power error value according to following mathematic formulae, and controls the output powers from the first output terminals and the second output terminals of the N power converters according to the first power error value to the N-th power error value, $$x = A^{-1}b$$

$$A = \begin{bmatrix} 1+2\rho & -\rho & 0 & \ldots & -\rho \\ -\rho & 1+2\rho & -\rho & \ldots & \ldots \\ 0 & -\rho & 1+2\rho & -\rho & \ldots \\ \ldots & \ldots & \ldots & \ldots & \ldots \\ -\rho & 0 & \ldots & -\rho & 1+2\rho \end{bmatrix},$$

$$b = \begin{bmatrix} 0.5\rho(P_{o2} - P_{oN}) \\ 0.5\rho(P_{o3} - P_{o1}) \\ \ldots \\ 0.5\rho(P_{o1} - P_{o(N-1)}) \end{bmatrix}$$

where, $x=[x_1, x_2, \ldots, x_i, \ldots, x_N]^T$, $x_i$ is the i-th power error value, $P_{oi}$ is the i-th total output power, and $\rho$ is a weighting coefficient, wherein the weighting coefficient is set by the computing control unit according to circuit characteristics of the power conversion system.

6. The power conversion system according to claim 5, wherein when the computing control unit determines that the i-th power error value is greater than an upper error limit, the computing control unit adjusts the i-th power error value to the upper error limit, wherein when the i-th power error value of the power error values is lower than a lower error limit, the computing control unit adjusts the i-th power error value to the lower error limit.

7. The power conversion system according to claim 3, wherein the power conversion system comprises N port controllers, and each port controller is electrically connected with the total output terminal of the corresponding power converter, wherein a first port controller of the N port controllers receives the first total output power, an input power reference value corresponding to the first DC/DC conversion circuit of the first power converter and an input power reference value corresponding to the second DC/DC conversion circuit of a second power converter of the N power converters, and outputs an input power reference value corresponding to the second DC/DC conversion circuit of the first power converter and an input power reference value corresponding to the first DC/DC conversion circuit of the second power converter, wherein an i-th port controller of the N port controllers receives the i-th total output power, an input power reference value corresponding to the first DC/DC conversion circuit of the i-th power converter and an input power reference value corresponding to the second DC/DC conversion circuit of the (i+1)-th power converter, and outputs an input power reference value corresponding to the second DC/DC conversion circuit of the i-th power converter and an input power reference value corresponding to the first DC/DC conversion circuit of the (i+1) power converter, wherein an N-th port controller of the N port controllers receives the N-th total output power, an input power reference value corresponding to the first DC/DC conversion circuit of the N-th power converter and an input power reference value corresponding to the second DC/DC conversion circuit of the first power converter, and outputs an input power reference value corresponding to the second DC/DC conversion circuit of the N-th power converter and an input power reference value corresponding to the first DC/DC conversion circuit of the first power converter, wherein i is less than or equal to (N−1).

8. The power conversion system according to claim 7, wherein each port controller comprises a first proportional unit, a first adder, a first subtractor, a second adder, a third adder, a second subtractor and a power coordinator, wherein after the first total output power is multiplied by 0.5 by the first proportional unit of the first port controller, a first intermediate variable is obtained, wherein after the first intermediate variable and the first power error value are added by the first adder of the first port controller, the input power reference value corresponding to the second DC/DC conversion circuit of the first power converter is obtained, wherein after the first power error value is subtracted from the first intermediate variable by the first subtractor of the first port controller, the input power reference value corresponding to the first DC/DC conversion circuit of the second power converter is obtained, wherein after the input power reference value corresponding to the second DC/DC conversion circuit of the first power converter and the input power reference value corresponding to the first DC/DC conversion circuit of the first power converter are added by the second adder of the first port controller, the received DC power of the first power converter is obtained, wherein after the input power reference value corresponding to the first DC/DC conversion circuit of the second power converter and the input power reference value corresponding to the second DC/DC conversion circuit of the second power converter are added by the third adder of the first port controller, the received DC power of the second power converter is obtained, wherein after the received DC power of the first power converter is subtracted from the received DC power of the second power converter by the second subtractor of the first port controller, a first power variable is obtained, wherein the power coordinator of the first port controller receives the first power variable and issues the first power error value, wherein after the i-th total output power is multiplied by 0.5 by the first proportional unit of the i-th port controller, an i-th intermediate variable is obtained, wherein after the i-th intermediate variable and the i-th power error value are added by the first adder of the i-th port controller, the input power reference value corresponding to the second DC/DC conversion circuit of the i-th power converter is obtained, wherein after the i-th power error value is subtracted from the i-th intermediate variable by the first subtractor of the i-th port controller, the input power reference value corresponding to the first DC/DC conversion circuit of the (i+1)-th power converter is obtained, wherein after the input power reference value corresponding to the second DC/DC conversion circuit of the i-th power converter and the input power reference value corresponding to the first DC/DC conversion circuit of the i-th power converter are added by the second adder of the i-th port controller, the received DC power of the i-th power converter is obtained, wherein after the input power reference value corresponding to the first DC/DC conversion circuit of the (i+1)-th power converter and the input power reference value corresponding to the second DC/DC conversion circuit of the (i+1)-th power converter are added by the third adder of the i-th port controller, the received DC power of the (i+1)-th power converter is obtained, wherein after the received DC power of the i-th power converter of the i-th port controller is subtracted from the received DC power of the (i+1)-th power converter by the second subtractor, an i-th power variable is obtained, wherein the power coordinator of the i-th port controller receives the i-th power variable and issues the i-th power error value, wherein after the N-th total output power is multiplied by 0.5 by the first proportional unit of the N-th port controller, an N-th intermediate variable is obtained, wherein after the N-th intermediate variable and the N-th power error value are added by the first adder of the N-th port controller, the input power reference value corresponding to the second DC/DC conversion circuit of the N-th power converter is obtained, wherein after the N-th power error value is subtracted from the N-th intermediate variable by the first subtractor of the N-th port controller, the input power reference value corresponding to the first DC/DC conversion circuit of the first power converter is obtained, wherein after the input power reference value corresponding to the second DC/DC conversion circuit of the N-th power converter and the input power reference value corresponding to the first DC/DC conversion circuit of the N-th power converter are added by the second adder of the N-th port controller, the received DC power of the N-th power converter is obtained, wherein after the input power reference value corresponding to the first DC/DC conversion circuit of the first power converter and the input power reference value corresponding to the second DC/DC conversion circuit of the first power converter are added by the third adder of the N-th port controller, the received DC power of the first power converter is obtained, wherein after the received DC power of the N-th power converter of the N-th port controller is subtracted from the received DC power of the first power converter by the second subtractor, an N-th power variable is obtained, wherein the power coordinator of the N-th port controller receives the N-th power variable and issues the N-th power error value.

9. The power conversion system according to claim 8, wherein the power coordinator of each port controller comprises an integration unit, an integral limiter, a second proportional unit, a fourth adder, a low-pass filtering unit and a circulation limiter, wherein after the first power variable is processed by the integral unit and the integral limiter of the first port controller sequentially, a first transition variable is obtained, wherein after the first power variable is processed by the second proportional unit of the first port controller, a second transition variable is obtained, wherein after the first transition variable and the second transition variable are added by the fourth adder of the first port controller, a third transition variable is obtained, wherein after the third transition variable is processed by the low-pass filtering unit and the circulation limiter of the first port controller sequentially, the first power error value is obtained, wherein after the i-th power variable is processed by the integral unit and the integral limiter of the i-th port controller sequentially, the first transition variable is obtained, wherein after the first power variable is processed by the second proportional unit of the i-th port controller, the second transition variable is obtained, wherein after the first transition variable and the second transition variable are added by the fourth adder of the i-th port controller, the third transition variable is obtained, wherein after the third transition variable is processed by the low-pass filtering unit and the circulation limiter of the i-th port controller sequentially, the i-th power error value is obtained, wherein after the N-th power variable is processed by the integral unit and the integral limiter of the N-th port controller sequentially, the first transition variable is obtained, wherein after the N-th power variable is processed by the second proportional unit of the N-th port controller, the second transition variable is obtained, wherein after the first transition variable and the second transition variable are added by the fourth adder of the N-th port controller, the third transition variable is obtained, wherein after the third transition variable is processed by the low-pass filtering unit and the circulation limiter of the N-th port controller sequentially, the N-th power error value is obtained.

10. The power conversion system according to claim 1, wherein the power conversion system is connected to M loads, wherein when $M \leq (N/2)$, the M total output terminals that are connected with the M loads are not adjacent to each other.

11. The power conversion system according to claim 1, wherein the power conversion system is connected to M loads, wherein when $M > (N/2)$, any two of the M total output terminals that are connected with the M loads are adjacent to each other or separated from each other through one total output terminal that is not connected with any of the M loads.

12. The power conversion system according to claim 1, wherein each power converter comprises an inverter and a transformer, and the transformer comprises a primary winding, a first secondary winding and a second secondary winding, wherein a first terminal of the inverter is connected with the input terminal of the power converter, a second terminal of the inverter is connected with the primary winding, the first secondary winding is connected with the first output terminal of the power converter, and the second secondary winding is connected with the second output terminal of the power converter.

13. The power conversion system according to claim 12, wherein a phase shift angle of a voltage at the primary winding of the transformer of each power converter is expressed by following mathematic formulae:

$$\varphi_{A1} = -PI(\overline{P} - P_{A1}) \text{ or } \varphi_{A1} = PI(\overline{V_{dc}} - V_{dc1})$$

$$\varphi_{Ai} = -PI(\overline{P} - P_{Ai}) \text{ or } \varphi_{Ai} = PI(\overline{V_{dc}} - V_{dci})$$

where, $\varphi_{A1}$ is the phase shift angle of the voltage at the primary winding of the transformer of the first power converter, $\varphi_{Ai}$ is the phase shift angle of the voltage at the primary winding of the transformer of the i-th power converter, PI is a proportional integral function according to circuit characteristics of the power conversion system, $\overline{P}$ is an average value of the input powers of the N power converters, $P_{A1}$ is the input power of the input terminal of the first power converter, $P_{Ai}$ is the input power of the input terminal of the i-th power converter, $\overline{V_{dc}}$ is an average value of the voltages of the input terminals of the N power converters, $V_{dci1}$ is a voltage of the input terminal of the first power converter, and $V_{dci}$ is a voltage of the input terminal of the i-th power converter.

14. The power conversion system according to claim 12, wherein a phase shift angle of a voltage at the second secondary winding of the transformer of each power converter is expressed by following mathematic formulae:

$$\varphi_{o1}=PI(V_{o1ref}-V_{o1})$$

$$\varphi_{oi}=PI(V_{oiref}-V_{oi})$$

where, $\varphi_{o1}$ is the phase shift angle of the voltage at the second secondary winding of the transformer of the first power converter, $\varphi_{oi}$ is the phase shift angle of the voltage at the second secondary winding of the transformer of the i-th power converter, PI is a proportional integral function according to circuit characteristics of the power conversion system, $V_{o1ref}$ is a reference voltage value of the total output terminal of the first power converter, $V_{oiref}$ is a reference voltage value of the total output terminal of the i-th power converter, $V_{o1}$ is a voltage of the total output terminal of the first power converter, and $V_{oi}$ is a voltage of the total output terminal of the i-th power converter.

15. The power conversion system according to claim 1, wherein the power conversion system further comprises N rectifier units, and the N rectifier units are connected with the N power converters in a one-to-one relationship, wherein input terminals of the N rectifier units are connected in series and connected to an AC power source, and output terminals of the N rectifier units are connected with the input terminals of the corresponding power converters.

16. The power conversion system according to claim 1, wherein each power converter further comprises a third output terminal, wherein the first output terminal of the first power converter, the second output terminal of the N-th power converter and the third output terminal of the second power converter are connected with each other, wherein the first output terminal of the i-th power converter, the second output terminal of the (i−1)-th power converter and the third output terminal of an (i+1)-th power converter of the N power converters are connected with each other.

17. The power conversion system according to claim 1, wherein the power conversion system further comprises at least one switch, wherein each switch is connected between two of the N total output terminals.

\* \* \* \* \*